United States Patent
Smith et al.

(10) Patent No.: US 6,505,141 B2
(45) Date of Patent: Jan. 7, 2003

(54) TRANSDUCER CIRCUIT

(75) Inventors: Anthony Paul Smith, Nottingham (GB); Simon Mark Smith, Leicester (GB)

(73) Assignee: Taylor Hobson Limited, Leicester (GB)

( * ) Notice: Subject to any disclaimer, the term of this patent is extended or adjusted under 35 U.S.C. 154(b) by 14 days.

(21) Appl. No.: 09/758,014

(22) Filed: Jan. 9, 2001

(65) Prior Publication Data

US 2002/0135386 A1 Sep. 26, 2002

Related U.S. Application Data

(63) Continuation of application No. PCT/GB99/02197, filed on Jul. 9, 1999.

(30) Foreign Application Priority Data

Jul. 9, 1998 (GB) ................................ 9814927

(51) Int. Cl.$^7$ ............................ G01B 5/18; G01B 7/26
(52) U.S. Cl. .................. 702/166; 702/168; 702/150; 33/551; 73/1.89; 73/105
(58) Field of Search ............................ 702/33, 35, 38, 702/72, 85, 87, 88, 94, 95, 127, 150, 155, 166–168, 189; 33/504, 551, 553–555; 73/1.79, 1.89, 105; 324/76.52, 76.53, 635, 659

(56) References Cited

U.S. PATENT DOCUMENTS

| 3,083,340 A | * | 3/1963 | Nelson ................... 324/76.52 |
| 4,070,762 A | | 1/1978 | Siddall ........................ 33/504 |
| 4,140,993 A | | 2/1979 | Carter .......................... 367/76 |
| 4,141,148 A | | 2/1979 | Noguchi ....................... 33/561 |
| 4,377,911 A | | 3/1983 | Iida et al. ..................... 33/561 |
| 4,506,333 A | * | 3/1985 | Porrot et al. .............. 324/76.77 |
| 4,574,625 A | | 3/1986 | Olasz et al. .................. 73/105 |
| 4,599,560 A | * | 7/1986 | Sanford et al. ............. 318/657 |

(List continued on next page.)

FOREIGN PATENT DOCUMENTS

| DE | 3309981 | 9/1984 | ............ G01B/7/02 |
| DE | G9010971.6 | 12/1990 | ............ G01B/7/02 |
| EP | 0404597 | 12/1990 | ............ G01R/15/10 |
| EP | 0545538 | 6/1993 | ............ G01B/7/34 |
| GB | 549987 | 12/1942 | |

(List continued on next page.)

OTHER PUBLICATIONS

Kautsch, V.R., "Inductive Messgrossenumformung, Teil II", *Technisches Messen ATM*, 410, Munchen, Germany, pp. 271–276, (Dec. 1970).

Primary Examiner—Marc S. Hoff
Assistant Examiner—Manuel L. Barbee
(74) Attorney, Agent, or Firm—Schwegman, Lundberg, Woessner & Kluth P.A.

(57) ABSTRACT

A position-to-electrical transducer circuit primarily intended for use in meteorological instruments for measuring a characteristic of a surface of a workpiece. An excitation signal generator provides to a transducer an excitation signal whose voltage varies in a known manner with time and a processor analyzes an electrical signal from the transducer to generate a measurement signal. The processor corrects for any phase shift between excitation signal and the electrical signal to provide an accurate measurement. A meteorological instrument for measuring a characteristic of a surface of a workpiece in which a pivotably-mounted arm holding a stylus is traversed relative to the surface of the workpiece and a variable transducer converts the position of the stylus into a corresponding electrical signal. The variable inductance transducer has at least two coils located on a core, the two coils being spaced apart along the length of the arm so that pivotal movement of the arm causes different changes in the inductance of the coils to provide an indication of the position of the stylus.

38 Claims, 14 Drawing Sheets

U.S. PATENT DOCUMENTS

| | | | |
|---|---|---|---|
| 4,731,934 A | 3/1988 | Barnaby et al. | 33/504 |
| 4,736,208 A | 4/1988 | Schmidt | 346/33 R |
| 4,807,152 A * | 2/1989 | Lane et al. | 318/578 |
| 4,825,557 A | 5/1989 | Nettleton et al. | 33/502 |
| 4,926,360 A * | 5/1990 | Spink, Jr. | 324/99 D |
| 4,941,265 A | 7/1990 | Heiland | 33/504 |
| 5,027,066 A | 6/1991 | Reder | 324/207.16 |
| 5,214,962 A | 6/1993 | Mahrenholz | 73/766 |
| 5,517,307 A | 5/1996 | Buehring et al. | 356/494 |
| 5,528,003 A | 6/1996 | Bodin et al. | 172/18 |
| 5,740,616 A | 4/1998 | Seddon et al. | 33/554 |
| 6,301,550 B1 * | 10/2001 | Okamoto et al. | 345/177 |

FOREIGN PATENT DOCUMENTS

| | | | |
|---|---|---|---|
| GB | 601053 | 4/1948 | 40/106 |
| GB | 701091 | 12/1953 | 37/40 |
| GB | 899285 | 11/1962 | G08C/40/106 |
| GB | 1155562 | 6/1969 | H03G/3/30 |
| GB | 2009409 | 6/1979 | G01B/7/28 |
| GB | 2075193 | 11/1981 | G01B/5/20 |
| GB | 2165361 | 4/1986 | G01B/7/34 |
| GB | 2192064 | 12/1987 | G01N/27/72 |
| GB | 2259367 | 3/1993 | G01B/5/06 |
| WO | WO 95/08096 | * 3/1995 | |
| WO | 95/08096 | 3/1995 | G01D/3/02 |

* cited by examiner

TRANSDUCER CIRCUIT

CROSS-REFERENCE TO RELATED APPLICATIONS

This application is a continuation application of the national stage filing of PCT/GB99/02197, filed on Jul. 9, 1999, which in turn is an international filing of Great Britain Application Number 9814927.1, filed on Jul. 9, 1998. PCT/GB99/02197 application and the corresponding WO 00/03196 publication are herein incorporated by reference.

The present invention relates to a transducer circuit and a control circuit for use with the transducer circuit. The transducer circuit has particular, but not exclusive, relevance to metrological instruments for measuring surface characteristics such as form, for example roundness, and roughness or surface texture.

WO 95/08096 describes such a metrological instrument, the Form Talysurf Plus manufactured by Taylor Hobson Limited, Leicester, England, UK. In this instrument, a stylus is pivotally mounted on an arm and the tip of the stylus is traversed across the surface of a workpiece. A transducer outputs a signal in accordance with the movement of the tip of the stylus in response to a surface characteristic, in the case of the Form Talysurf Plus the surface roughness or texture, of the workpiece.

The transducer of the Form Talysurf Plus comprises an inductance which has a centre tap connected to earth and a moveable core which moves in response to movements of the stylus tip. A bridge circuit is formed by connecting each end of the inductance to a respective end of a variable potentiometer whose wiper is connected to earth.

An oscillator, whose centre tap is grounded, supplies an oscillating voltage via matched resistors to the bridge circuit. The voltages at the ends of the inductance are sampled and processed through a summing circuit and a difference circuit. When the bridge circuit is balanced, the output of the summing circuit is a null signal as the voltages at opposite ends of the inductance have identical amplitudes but are 180° out of phase. If the bridge circuit is not balanced, for example due to movement of the core in response to movement of the stylus, the summing circuit will provide a non-null output signal. The output of the difference circuit is an oscillating signal with a substantially constant amplitude.

A digital output representative of the position of the stylus is obtained by:

i) supplying the output of the difference circuit to a multiplying digital-to-analogue converter (DAC) which multiplies the output of the difference circuit by a digital value;

ii) comparing the output of the DAC with the output of the summing circuit; and iii) adjusting the value by which the DAC multiples the output of the difference circuit so that the output of the DAC has an identical amplitude and is 180° out of phase with the output of the summing circuit.

The digital value by which the multiplying digital-to-analogue converter multiplies the output of the difference circuit provides a digital signal representative of the position of the stylus.

WO 95/08096 discloses how to adjust the circuit described above to reduce a number of errors which may be present in the measurement. One particular adjustment involves incorporating a variable phase shift network between the difference circuit and the multiplying DAC. This variable phase shift network can be adjusted to allow for phase shift between the outputs of the summing circuit and the difference circuit.

The variable phase shift network is automatically controlled by monitoring a signal obtained by summing the output of the summing circuit and the output of the multiplying DAC. If the outputs of the summing circuit and the difference circuit are out of phase there will be a residual ripple voltage when these two signals are added together. The phase shift circuit is automatically adjusted to minimise this ripple voltage thereby ensuring that the signals are substantially in phase.

Although the instrument disclosed in WO 95/08096 provides accurate measurement of surface characteristics, the instrument is also expensive.

The present invention is concerned with developing alternative instruments to that disclosed in WO 95/08096. In particular, the present invention aims to provide an instrument which can be manufactured at a significantly reduced cost compared to the cost of the instrument disclosed in WO 95/08096.

BRIEF SUMMARY OF THE INVENTION

In one aspect, the present invention provides a metrological instrument, for example an instrument for measuring surface form and/or roughness, or a transducer circuit suitable for use in such an instrument, wherein a position transducer such as, for example, an LVDT (Linear Variable Differential Transducer) is provided with a digitally generated excitation signal.

In one aspect, the present invention provides a metrological instrument, for example an instrument for measuring surface form and/or roughness, or a transducer circuit suitable for use in such an instrument, wherein in order to ensure that the output of a position transducer, for example an LVDT (Linear Variable Differential Transducer), is sampled at a known point, for example at a known phase of the output signal, the output signal is compared with a number of samples corresponding to an excitation signal (which may be a digitally generated signal) supplied to the position transducer but each of different phase from one another to determine which of the samples is closest in phase to the output signal of the position transducer.

In one aspect, the present invention provides a metrological instrument, for example an instrument for measuring surface form and/or roughness, or a transducer circuit suitable for use in such an instrument, wherein in order to identify a peak in the output of a position transducer, for example an LVDT (Linear Variable Differential Transducer), a number, generally two, of points of the output signal having a known phase relationship with one another are sampled, by, for example, sampling the output signal when an excitation signal (which may be a digitally generated signal) supplied to the position transducer has first and second given phases.

In an embodiment, the present invention provides a transducer circuit, comprising: a sub-circuit for generating a periodically varying signal for supply to a position-to-electrical transducer, the position-to-electrical transducer being arranged to produce an analogue electrical signal dependent upon the position of a probe; an analogue-to-digital converter for converting the analogue electrical signal to a digital electrical signal; and a processor for analysing signals received from the analogue-to-digital converter and the sub-circuit to provide a measurement signal for providing a measurement of the position of the probe, wherein the sub-circuit includes digital components arranged to generate the periodically varying signal in accordance with a clock signal.

An advantage obtained by using a digitally based system to generate the periodically varying signal is that the properties of the periodically varying signal generated are well-defined and predictable and so it is not necessary to continuously monitor the properties of the periodically varying signal.

The replacement of the analogue oscillator of WO 95/08096 with a digitally based system can also lead to a reduction of the total number of components required in the transducer circuit as an increased amount of signal processing can be carried out in the processor due to the well-defined signal produced. There is also a reduction of noise due to the removal of analogue components which have an inherent noise and are susceptible to electrical pick-up.

In an embodiment, the present invention provides a transducer circuit, comprising: a clock producing a train of clock signals at a constant frequency; a sub-circuit for providing an analogue signal, whose voltage varies periodically, to a transducer for producing an electrical signal dependent on the position of a probe; an analogue-to-digital converter for converting the electrical signal into a digital signal; and a processor for analysing signals received from the sub-circuit and the analogue-to-digital converter to provide a measurement signal providing a measurement of the position of the probe, wherein the processor is adapted to correct for any phase shift between the analogue signal and the electrical signal in accordance with information received from the sub-circuit and the analogue-to-digital converter.

Preferably, the clock is a crystal oscillator as a crystal oscillator provides a signal which is substantially immune to frequency drift. Furthermore, a crystal oscillator does not require a long warm-up period.

Preferably the crystal oscillator is an integral part of the processor thereby reducing the total number of components in the circuit.

Conveniently, the amplitude of the analogue signal varies sinusoidally.

In an embodiment of the present invention, the transducer circuit is provided in a metrological instrument for measuring a characteristic of a surface of a workpiece, wherein the probe is a stylus and the position-to-electrical transducer is an inductive transducer having a coil and a core for the coil, the inductive transducer being arranged so that movement of the stylus in response to the characteristic of the surface causes relative movement between the coil and the core, and the instrument further comprises an arm for holding the stylus so that the stylus may be traversed relative to the surface of the workpiece.

A transducer circuit embodying the present invention is particularly well suited to metrological instruments of the type described above as high resolution can be obtained over a large measurement range.

BRIEF DESCRIPTION OF THE DRAWINGS

Exemplary embodiments of the present invention will now be described with reference to the accompanying drawings in which.

DETAILED DESCRIPTION OF THE INVENTION

Figure 1:
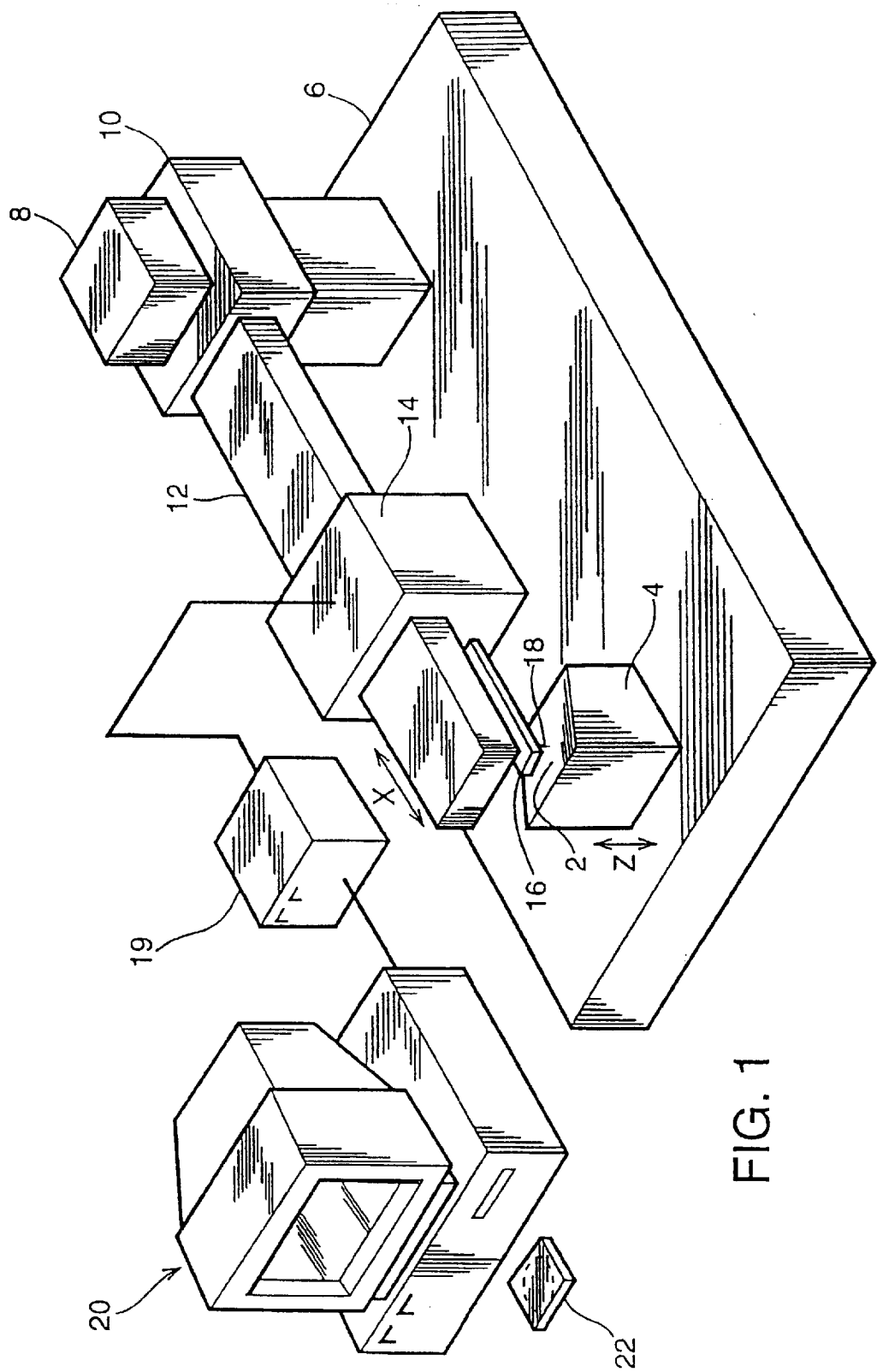
FIG. 1 is a very schematic diagram of a metrological instrument suitable for incorporating a transducer circuit according to the present invention.

For exemplary purposes only, the present invention will be described in the context of a metrological instrument for measuring the surface roughness or texture of a surface 2 of a workpiece 4, as shown very schematically in FIG. 1.

The metrological instrument comprises a base 6 which supports the workpiece 4. A vertical column 8 is secured to the base 6 and supports a first carriage 10 which can be moved up and down the vertical column 8 to position the stylus 18 on the workpiece 4.

A horizontal datum bar 12 is mounted on the first carriage 10. A second carriage 14 is mounted for horizontal movement along the datum bar 12. A stylus arm 16 carrying a stylus 18 is pivotally mounted on the second carriage 14.

In operation, the second carriage 14 is moved along the datum bar 12 in the direction marked x in FIG. 1, thus traversing the stylus 18 along the surface 2 of the workpiece 4. The movement of the stylus 18 in the direction marked z in FIG. 1 in response to the surface 2 cause s a respective relative movement between a core and a coil of a linear variable differential transducer (LVDT) (not shown in FIG. 1) thereby enabling measurement of the movement of the stylus 18 as it follows the surface 2 being measured.

As the stylus 18 may have a small range of movement for which an accurate signal can be produced, the first carriage 10 may be moved up and down the vertical column 8 during operation to increase the measurement range of the instrument.

A signal from the LVDT representative of the surface 2 is supplied to an interface module 19 where it is processed to produce measurement data for the surface 2. The interface module 19 is connected to a computer 20 which can access and analyse the measurement data. The computer has a facility for receiving a disc 22 which may either contain software for controlling the computer or may provide a memory for storing measurement data.

Figure 2:
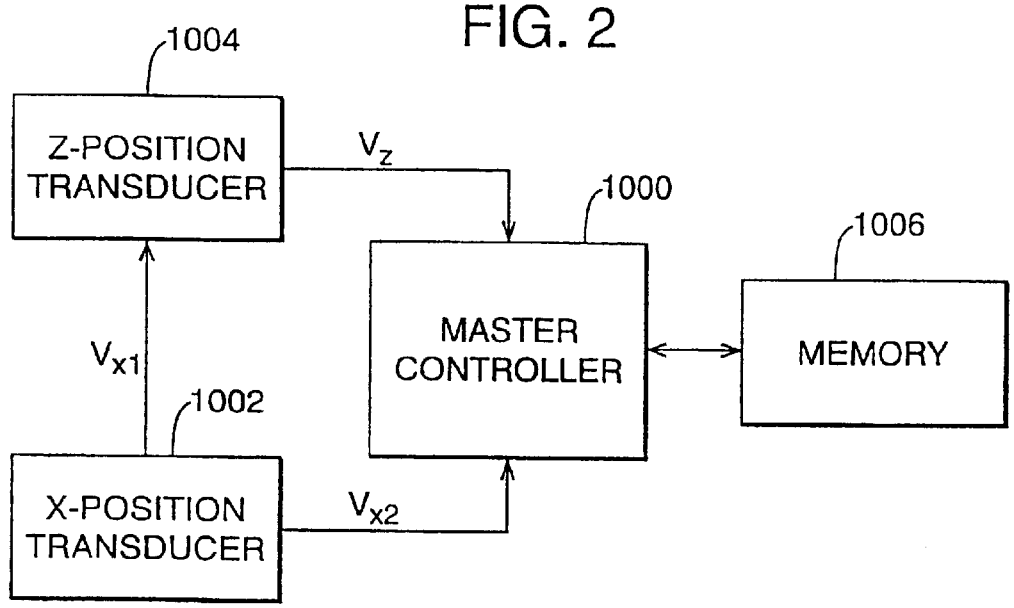
FIG. 2 is a very schematic diagram of control circuitry of the metrological instrument shown in FIG. 1.

A very schematic diagram of the control circuitry of the metrological instrument shown in FIG. 1 is illustrated in FIG. 2. Typically, only the core and the coil of the LVDT used in the z-position transducer circuit will be housed in the second carriage 14, all the other measurement circuitry being located in the interface module 19.

A master controller 1000, in response to an instruction by a user to initiate a measurement, controls a motor (not shown) to move the second carriage 14 along the datum bar 12 in the x-direction. Additionally the master controller 1000 may activate a second motor (not shown) to move the first carriage 10 along the vertical column 8 in the z-direction to locate the stylus 18 on the surface 2 or to increase the measurement range.

The x-position transducer 1002 is provided to determine the position of the second carriage 14 along the datum bar 12. The x-position transducer may be, for example, an optical interferometer with a diffraction grating mounted on one of the second carriage 14 and the datum bar 12 and the interferometer system mounted on the other of the second carriage 14 and the datum bar 12 (similar to that described in U.S. Pat. No. 5,517,307 but using a planar grating as used in, for example, an optical transducer such as that described in U.S. Pat. No. 5,063,291).

In use, when the second carriage 14 reaches selected positions along the datum bar 12, the x-position transducer sends a signal $V_{x1}$ to a z-position transducer 1004 initiating a measurement of the displacement in the z-direction of the stylus 18. Additionally, the x-position transducer sends a signal $V_{x2}$ to the master controller 1000 informing the master controller 1000 that a new measurement by the z-position transducer had been initiated. The master controller 1000 subsequently receives a signal $V_z$ from the z-position transducer 1004 providing a measurement of the displacement of the stylus 18 in the z-direction. The master controller 1000 then stores in the memory 1006 the displacement of the stylus 18 in the z-direction for the associated x position.

Figure 3:
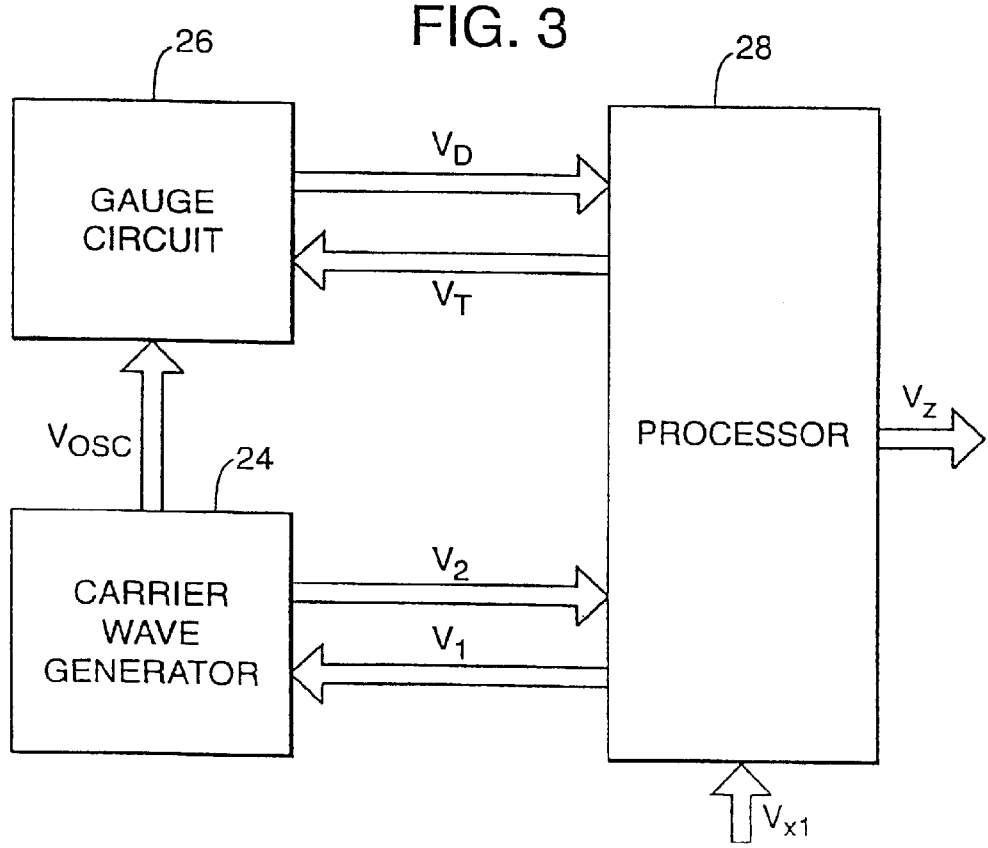
FIG. 3 is an overall schematic diagram of z-position transducer circuitry according to the present invention for the instrument shown in FIGS. 1 and 2.

FIG. 3 illustrates the main elements of the z-position transducer 1004. A carrier wave generator 24 supplies an oscillating voltage signal $V_{OSC}$ to a gauge circuit 26. Included in the gauge circuit 26 is the LVDT (not shown) whose output varies in response to the movement of the stylus 18.

A processor 28 outputs a signal $V_1$ to the carrier wave generator 24 which provides timing information for the production of the oscillating voltage signal $V_{OSC}$. The carrier wave generator 24 provides a signal $V_2$ to the processor 28 providing phase information about the oscillating voltage signal $V_{OSC}$.

The gauge circuit 26 outputs a digital measurement signal $V_D$ representative of the position of the stylus in the z-direction to the processor 28 in response to a trigger signal $V_T$ from the processor 28. The trigger signal $V_T$ is generated by the processor 28 in response to the signal $V_{X1}$ from the x-position transducer 1002 initiating a measurement. The exact timing of the trigger signal $V_T$ is dependent upon the signal $V_2$ providing phase information about the oscillating voltage signal $V_{OSC}$ as will be described in detail hereafter. On the basis of this, the processor 28 outputs a signal $V_z$ providing a measurement of the position of the stylus 18 in the z-direction.

Figure 4:
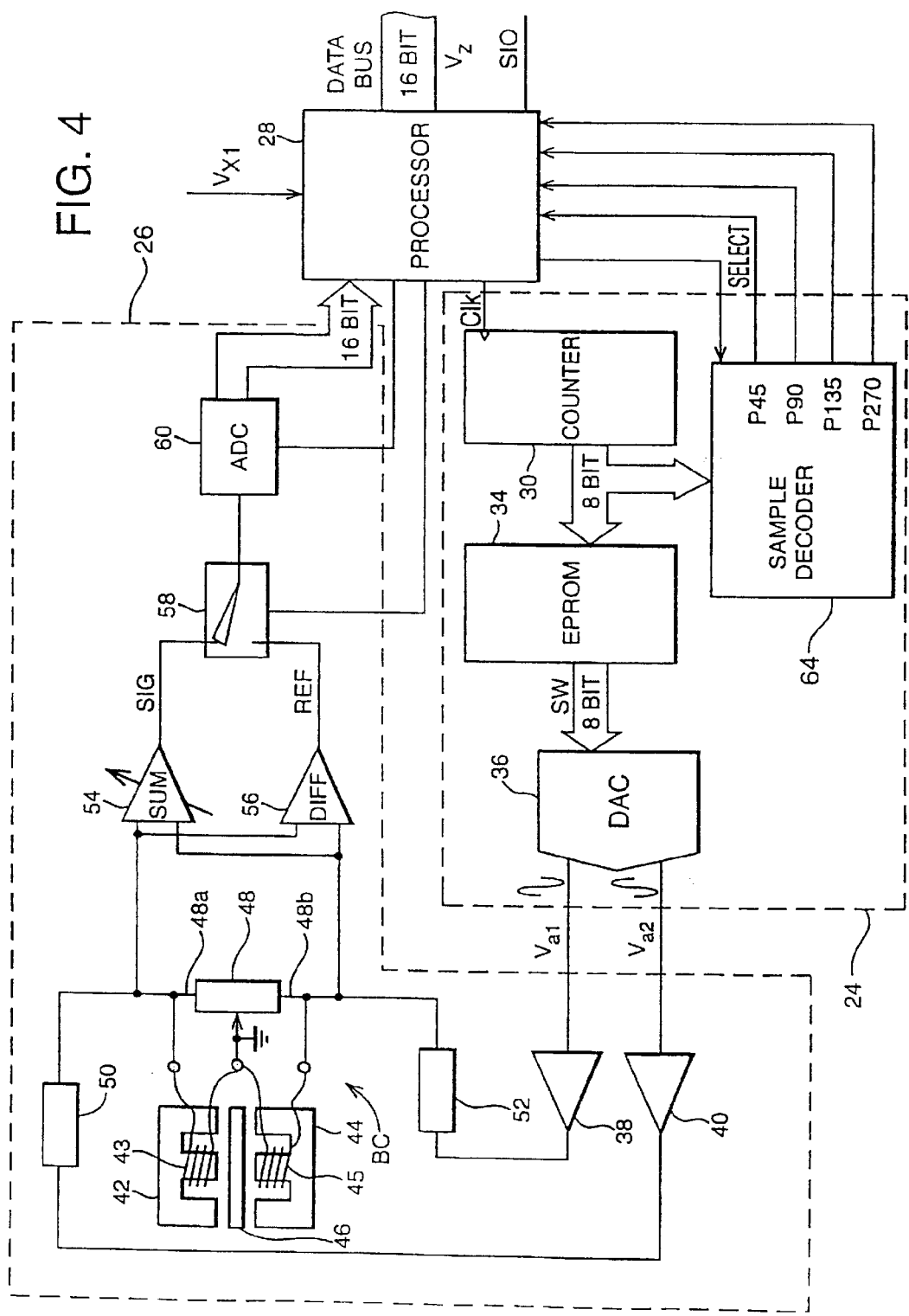
FIG. 4 is a block diagram of a first embodiment of a transducer circuit according to the present invention.

With reference to FIG. 4, there will now be described in greater detail a first embodiment of the transducer circuit. The carrier wave generator 24 and gauge circuit 26 of FIG. 3 have been indicated by dashed blocks.

In the first embodiment, a conventional counter 30 provides an 8-bit digital number. The 8-bit number is increased by one each time a clock signal Clk is received from the processor 28 so that the output of the counter 30 cycles from 0 to 255. In this embodiment, the clock signal has a frequency of 2.5 MHz and is derived from a crystal oscillator (not shown) in the processor 28.

The 8-bit digital number is input to an EPROM 34 as the address of a corresponding memory location in the EPROM 34 containing another 8-bit digital number. The EPROM 34 stores 8-bit digital numbers such that, when the memory locations are addressed in ascending order by the output of the counter 30, a train of digital values representing a digitized sine wave signal SW is output from the EPROM 34.

The digitized sine wave signal SW is input to a digital-to-analogue converter (DAC) 36 which converts the digital signal SW into a first analogue signal $V_{a1}$ having a voltage which oscillates in phase with the digitized sine wave signal SW. The DAC 36 also outputs a second analogue signal $V_{a2}$ which has a voltage having the same peak value as the first analogue signal $V_{a1}$ but which oscillates 180° out of phase with the digitized sine wave signal SW. In this embodiment the DAC 36 is a conventional DAC-08 8-bit high-speed D/A converter available from Analog Devices.

The first and second analogue signals $V_{a1}$ and $V_{a2}$ are supplied to respective buffer amplifiers 38, 40 of the gauge circuit 26. The buffer amplifiers 38, 40 are required in this embodiment to drive the gauge circuit with sufficient power and at the correct voltage level.

In this example, the variable impedance transducer in the gauge circuit consists of an inductor having two E-shaped cores 42, 44 (that is cores having a backbone with three equally spaced fingers projecting therefrom) and an I-shaped core 46 (that is a core having only a backbone). The I-shaped core 46 is connected to the stylus arm 16 in conventional manner (for example as shown in U.S. Pat. No. 5,517,307) so that movement of the stylus 18 causes a corresponding movement of the I-shaped core 46. A coil 43, 45 is wound around the central finger of each E-shaped core 42, 44. One end of each coil 43, 45 is connected to ground while the other end is connected to a respective end of an adjustable potentiometer 48. The wiper of the adjustable potentiometer 48 is connected to ground (earth).

In this way a bridge circuit BC is formed by the coils 43, 45 around the two E-shaped cores 42, 44 and the potentiometer 48.

The first and second analogue signals $V_{a1}$, $V_{a2}$ are supplied to respective ends 48a and 48b of the potentiometer 48 via respective ones of a pair of matched resistors 50, 52.

The crystal oscillator used to generate the clock signal is advantageous as it provides a clock signal with substantially no frequency drift and hence frequency drift in the analogue signals $V_{a1}$, $V_{a2}$ supplied to either end of the potentiometer 48, which can be a problem in conventional oscillators, is substantially eliminated.

In a balanced condition, the voltages at the ends 48a and 48b of the potentiometer 48 will have identical peak values and be 180° out of phase with each other. However, if the bridge circuit BC is not balanced, for example due to movement of the I-shaped core 46 caused by movement of the stylus 18, the amplitudes of the voltages at either end 48a, 48b of the potentiometer 48 will no longer be identical.

The voltages at either end 48a, 48b of the potentiometer 48 are supplied to a conventional sum circuit 54, which produces a signal obtained by adding the two voltages together, and a conventional difference circuit 56, which produces a signal obtained by subtracting the two voltages. The sum circuit 54 includes a variable component which can be adjusted to vary the gain of the sum circuit 54. The sum circuit 54 and the difference circuit 56 are identical to those disclosed in FIG. 12 of WO 95/08096, the whole contents of which are hereby incorporated by reference.

When the bridge circuit BC is balanced, as the signals at the ends 48a and 48b of the bridge circuit BC will be of equal amplitude but 180° out of phase, the output $V_{Sig}$ of the sum circuit 54 will be a null signal. However, if the bridge circuit is not balanced the output $V_{Sig}$ of the sum circuit 54 will be an oscillating signal whose frequency is identical to the frequency of the first and second analogue signals $V_{a1}$, $V_{a2}$ and whose amplitude will vary depending on the position of the I-shaped core 46 in relation to the coils 43, 45.

The output of the difference circuit 56 will be a signal $V_{Ref}$ with a substantially constant amplitude independent of the position of the I-shaped core 46 over the normal, linear range of the gauge.

As explained in WO 95/08096, slight differences in the resistances of the two coils 43, 45 will introduce a quadrature component into the voltages at the ends of the potentiometer 48. The position of the wiper of the variable potentiometer 48 can be adjusted to reduce this quadrature component. In this embodiment the position of the wiper is manually set prior to use.

A switch 58 feeds either the output $V_{Sig}$ of the sum circuit 54 or the output $V_{Ref}$ of the reference circuit 56 to an analogue-to-digital converter (ADC) 60. In this embodiment the ADC 60 is a LTC 1605 16-Bit, 100 ksps sampling ADC supplied by Linear Technology of Milpitas, Calif., USA. The ADC 60 tracks the signal and, in this embodiment, produces a 16-bit digital signal to be input into the processor 28.

The output of the counter 30 is also supplied to a sample decoder 64. In this embodiment, the sample decoder 64 stores sample overlays each of which consists of timing information for a respective different one of sixty-four sine waves having the same frequency as the sine wave stored in the EPROM 34 but successively phase-shifted by 1.4°. In this embodiment the thirty-second sample overlay corresponds to a sine wave having the same phase as the sine wave generated by the EPROM 34 so that sample overlays corresponding to sine waves with phase shifts in the range of −45° to +45° compared to the phase of the digitized sine wave signal SW are stored in the sample decoder 64. The sample decoder 64 is made in this embodiment using EPROM.

The processor 28 is connected to the sample decoder 64 so that the processor 28 can select one of the stored sample overlays. The timing information of the sample overlays stored in the sample decoder 64 enables the sample decoder 64 to send signals to the processor 28 indicating when the phase of the selected sample overlay passes through 45°, 90°, 135° and 270°.

The processor 28 processes information from the ADC 60 and the sample decoder 64. In this embodiment the processor 28 is an Intel MCS251 Processor. The processor 28 is connected to the switch 58 enabling the processor 28 to switch the input to the ADC 60 between $V_{Sig}$ and $V_{Ref}$.

The processor 28 is also connected to the ADC 60 enabling the processor 28 to trigger the ADC 60 to sample the input and output a 16 bit digital value representative of the sampled input.

For each x-direction position indicated by a signal $V_{X1}$ from the x-position transducer 1002, the processor 28 produces a signal $V_Z$, dependent on the signals received from the ADC 60 and the sample decoder 64, which provides a measurement of the corresponding displacement in the z-direction of the stylus 18. This signal can be output as either parallel or series data. An advantageous feature of this embodiment is that the transducer circuit can be made compact as analogue components employed in generating an oscillating voltage are bulkier than the corresponding digital components.

Figure 5:
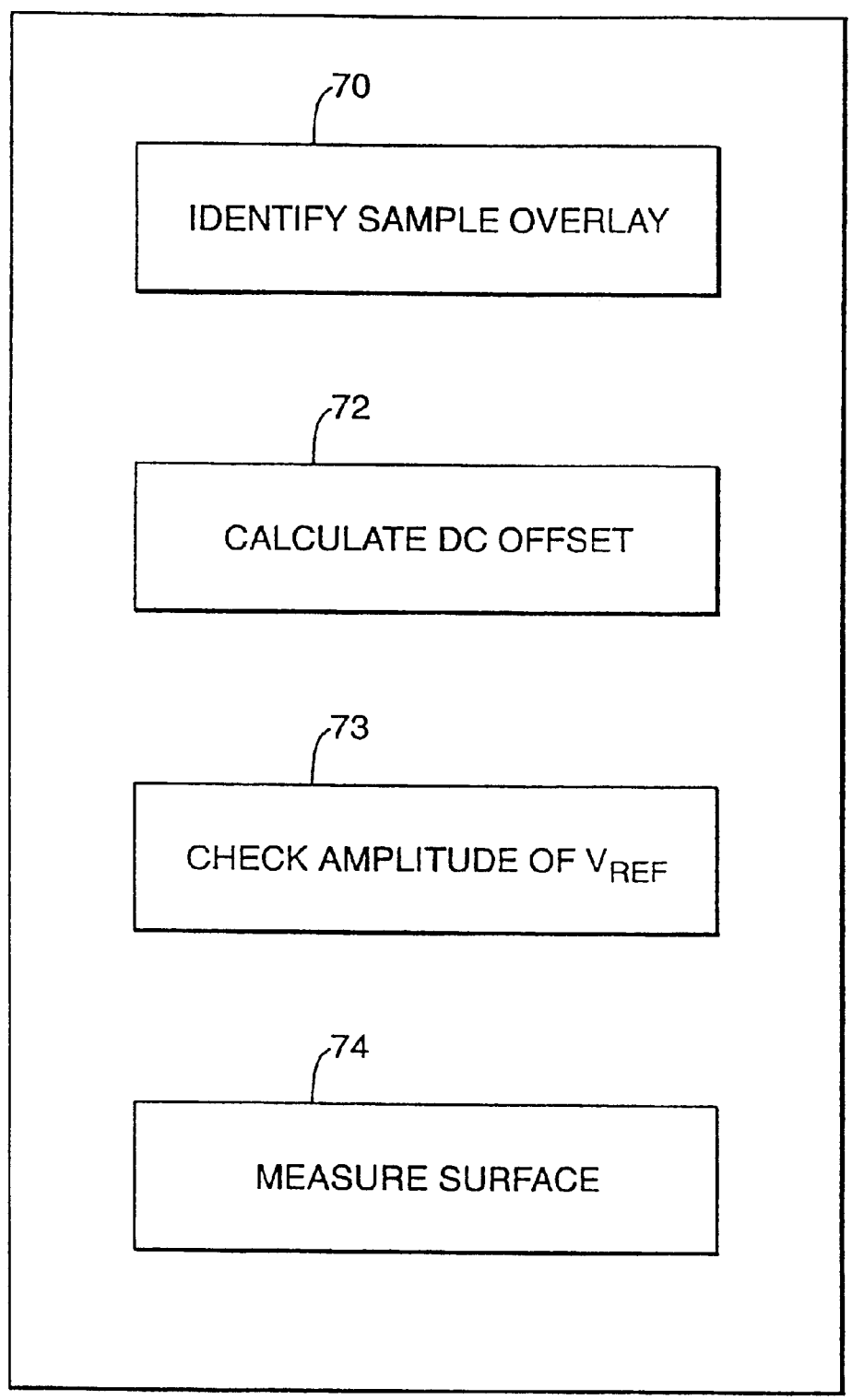
FIG. 5 is a block diagram showing a number of sub-routines stored in a processor of a transducer circuit according to the first embodiment.

As shown in FIG. 5, a number of procedures are stored in the processor 28. These procedures include an "identify sample overlay" sub-routine 70, a "calculate DC offset" sub-routine 72, a "Check Amplitude of $V_{Ref}$" sub-routine 73 and a "measure surface" sub-routine 74. The "identify sample overlay" sub-routine identifies the sample overlay stored in the sample decoder 64 corresponding to a sine wave whose phase most closely matches the phase of the signal input to the ADC 60. The "calculate DC offset" sub-routine calculates the DC offset of the signal input to the ADC 60. The "Check Amplitude of $V_{Ref}$" sub-routine 73 checks that the amplitude of the output of the difference circuit $V_{Ref}$ has not drifted, and the "measure surface" sub-routine 74 is used when measuring the characteristic of the surface of the workpiece.

Figure 6:
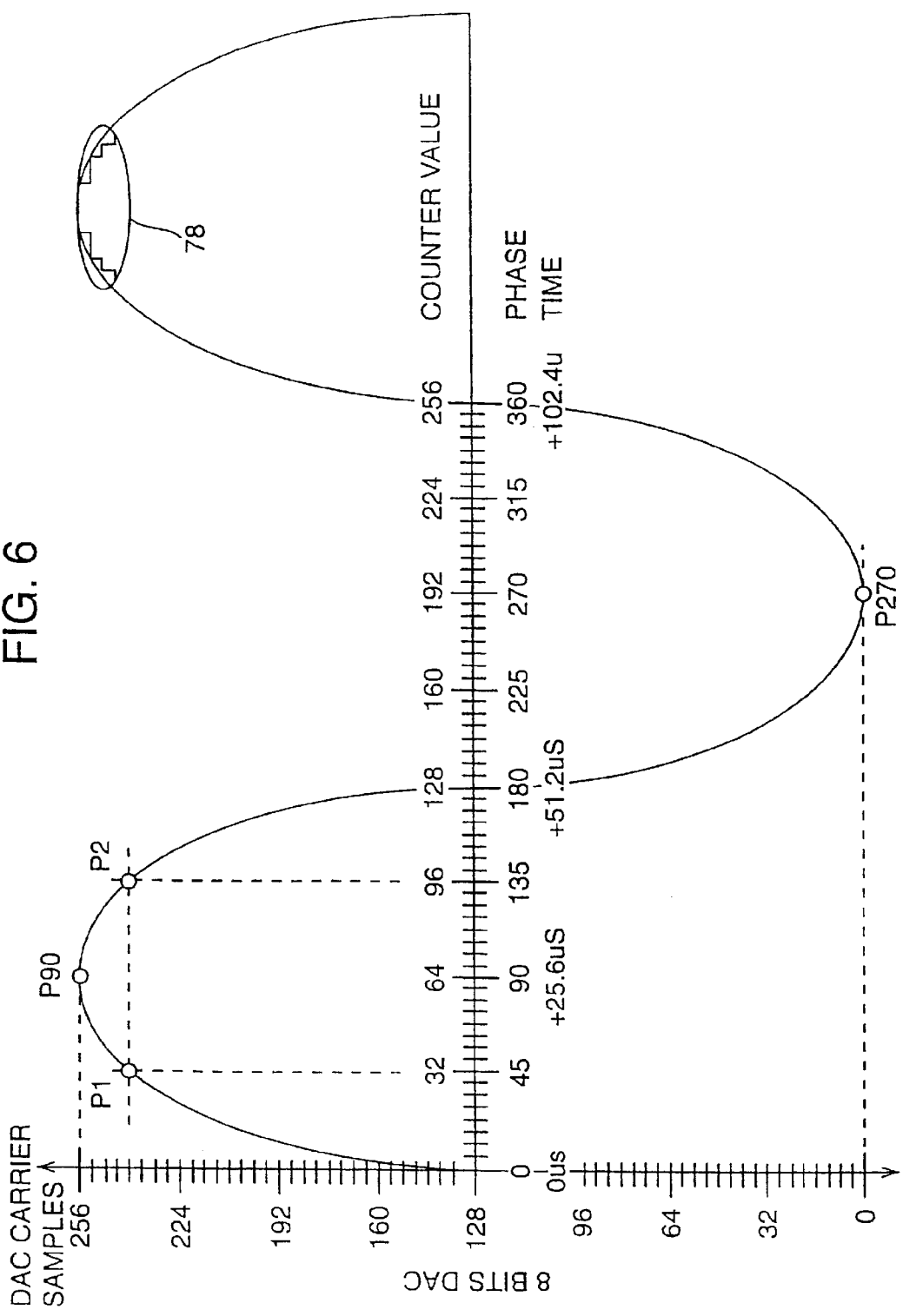
FIG. 6 is a graphical representation of an output of an EPROM of a transducer circuit according to the first embodiment of the present invention.

FIG. 6 shows an example of the sinusoidal output of the DAC 36. Since, in this embodiment, the counter 30 has 256 separate values and the clock is driven at a frequency of 2.5 MHz, the frequency at which the output varies is 9.76 KHz and the value of the output of the EPROM 34 changes every 1.4°. In the highlighted portion 78, the digital nature of the output from the EPROM 34 has been magnified.

The signal input to the ADC 60 will also have a sinusoidal variation of magnitude. A problem which needs to be addressed is how to ensure that the output of the ADC 60 is sampled at a point whose phase is known so that each measurement is made at the same phase of the output of the ADC 60 because, as has been previously mentioned, the output of the DAC 36 is not necessarily in phase with the signal input to the ADC 60 and hence the sampling of the ADC 60 cannot be triggered straight from the output of the EPROM 34.

The solution proposed in the present embodiment is to identify the sample overlay stored in the sample decoder 64 whose phase most closely matches the phase of the signal input to the ADC 60, and to use this sample overlay to trigger the sampling of the ADC 60. In the present embodiment, the identification of the correct sample overlay is achieved by employing the feature of a sinusoidally varying signal that the magnitude of the signal when the phase is at 45°, P1 in FIG. 6, is equal to the magnitude of the signal when the phase is at 135°, P2 in FIG. 6.

Figure 7A:
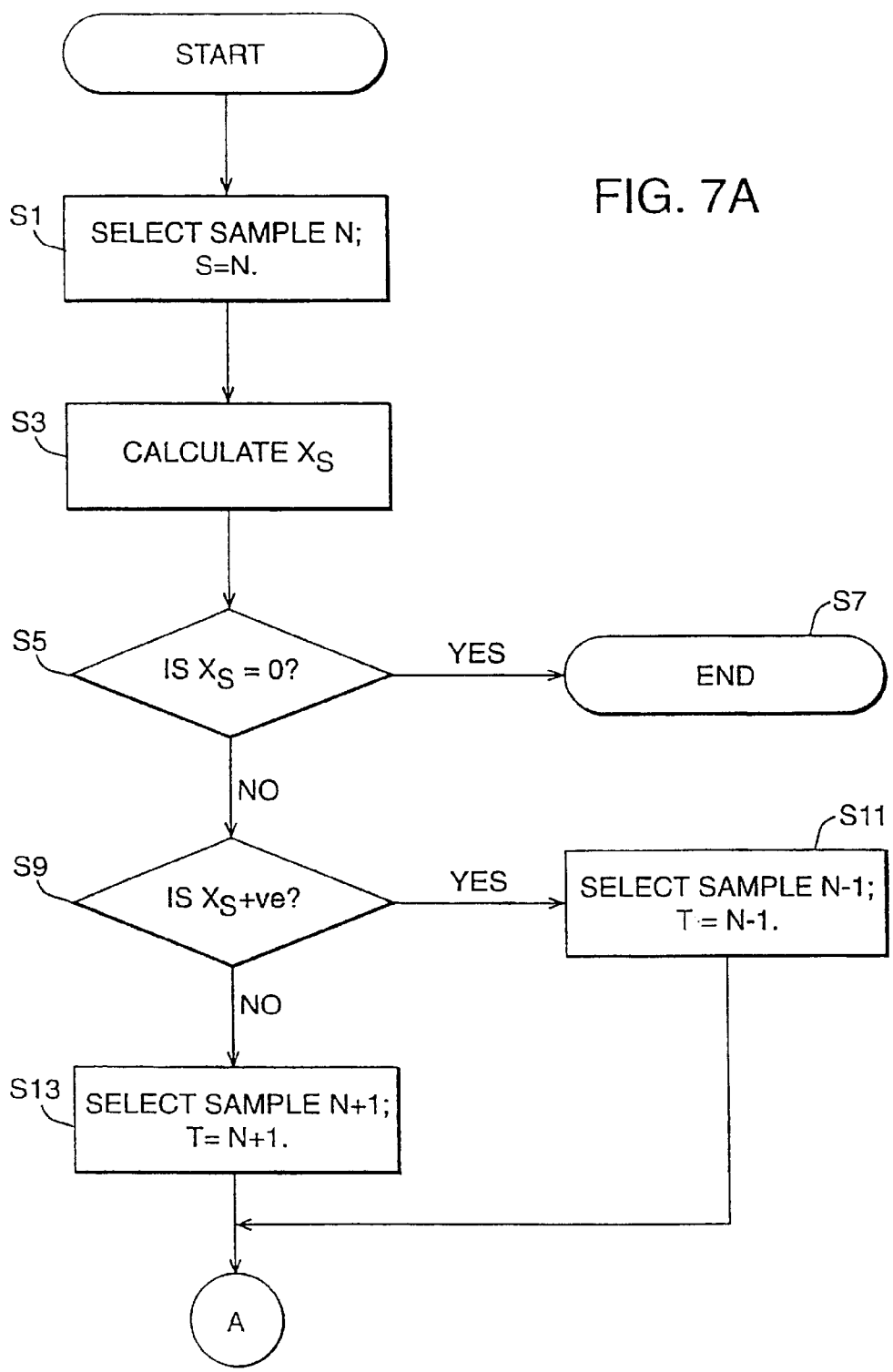
FIGS. 7A and 7B show a flow chart indicating a routine used in the first embodiment of the present invention to identify a sample overlay whose phase is closest to a signal input to an analogue-to-digital converter of the transducer circuit.
Figure 7B:
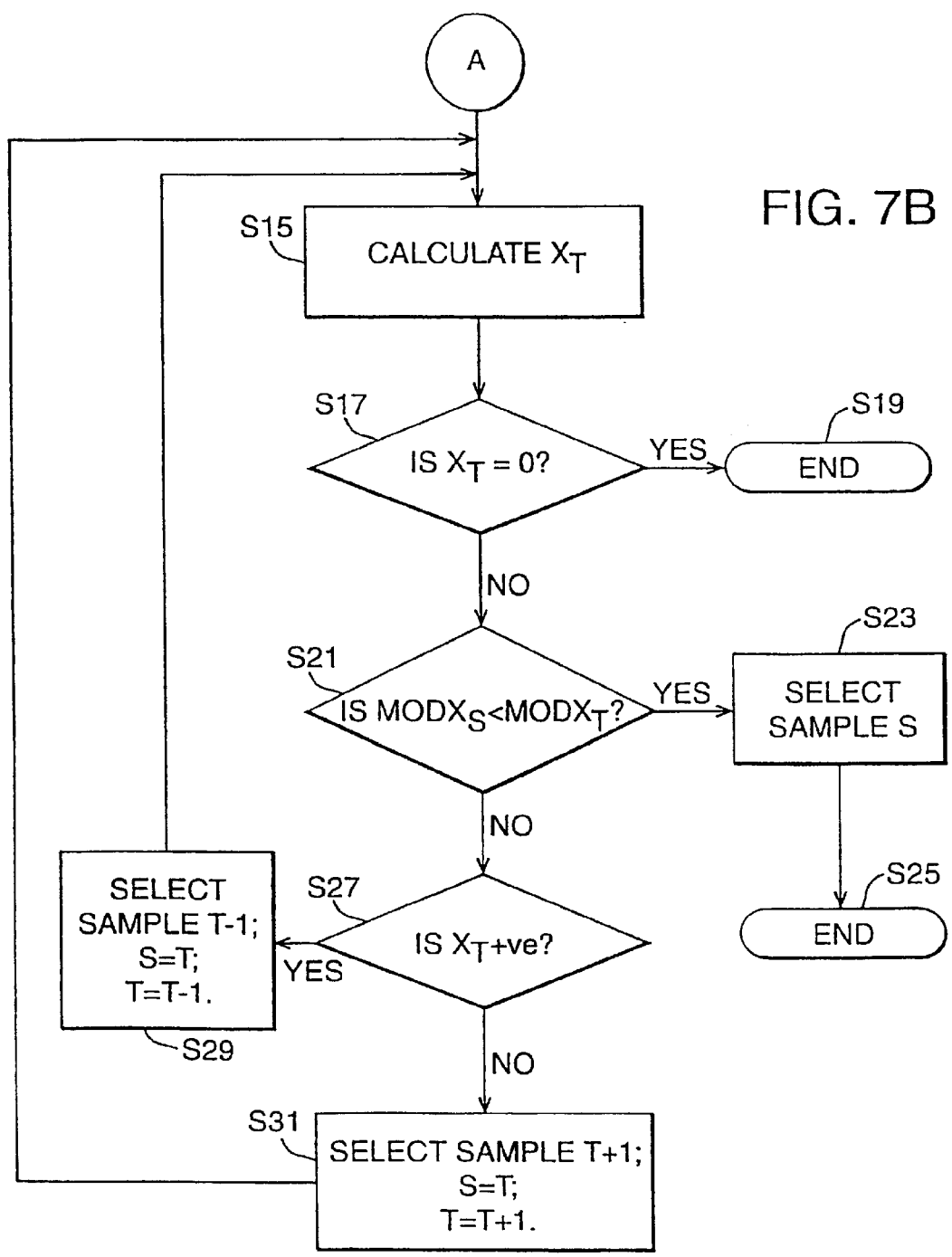

FIGS. 7A and 7B shows the steps of the "identify sample overlay" sub-routine used to identify the correct sample overlay.

As step S1 the sample N whose phase is identical to the phase of the output of the EPROM 34 is selected by the processor 28. In this embodiment it is the thirty second sample overlay whose phase matches the output of the EPROM 34. A number S stored in the processor 28 is set to be equal to N.

Next, in step S3, the value $X_S$ is calculated, where $X_S$ is given by the value obtained by sampling the output of the ADC 60 when the sample decoder 64 indicates that the phase of the sample overlay S passes through 45° minus the value obtained by sampling the output of the ADC 60 when the sample decoder 64 sends a signal indicating that the phase of the sample overlay S passes through 135°.

The processor 28 checks, in step S5, if $X_S$ is equal to zero. If $X_S$ is equal to zero then the phase of the selected sample S stored in the sample decoder 64 matches the phase of the signal input into the ADC 60 and the sub-routine is terminated at step S7. If $X_S$ is not equal to zero, then the sub-routine proceeds to step S9.

In step S9 the processor checks if $X_S$ is greater than zero. If $X_S$ is greater than zero then the phase of the sample S stored in the sample decoder 64 leads the phase of the signal input into the ADC 60. In this case, in step S11, the processor 28 selects the sample N−1, whose phase lags that of the sample N by 1.4°. Also in step S11 the processor 28 sets the value of a number T stored in the processor 28 equal to N−1.

If the value of $X_S$ is less than zero then the phase of the sample overlay N lags the phase of the signal input to the ADC 60 and the processor 28, in step S13, selects the sample overlay N+1 whose phase leads that of the sample overlay N by 1.4°. In step S13 the processor 32 sets the value of T equal to N+1.

In step S15 the processor calculates the value of $X_T$. At this point, the processor 28 has stored a number T indicating the number of the sample overlay being currently tested and the value $X_T$ which is a measure for the sample overlay T of the value obtained by subtracting the value sampled from the ADC 60 when the phase of the sample overlay T passes through 135° from the value sampled from the ADC 60 when the phase of the sample overlay T passes through 45°. The processor 28 also stores a number S indicating the number of the sample overlay which had been tested immediately before the current sample overlay T, and the value $X_S$ for sample overlay S.

The processor 28 checks, in step S17, if the value $X_T$ is equal to zero. If the value of $X_T$ is equal to zero then the phase of the selected sample overlay T matches the phase of the signal input into the ADC 60 and the sub-routine is terminated in step S19. If the value of $X_T$ is not equal to zero then the sub-routine proceeds to step S21.

In step S21 the processor 28 investigates whether the modulus of $X_S$ is less than the modulus of $X_T$. If the modulus of $X_S$ is less than the modulus of $X_T$ then the sample overlay S will be the sample overlay whose phase most closely matches that of the signal input to the ADC 60. In this case, in step S23 the sample overlay S is selected and, in step S25, the initialisation process is ended.

If the modulus of $X_S$ is greater than the modulus of $X_T$ then the processor 28 investigates in step S27 if $X_T$ is greater than zero. If $X_T$ is greater than zero then, in step S29, sample T−1 is selected and S is set to be equal to the value of T and subsequently the value of T is set equal to T−1. The process then returns to step S15.

If the value of $X_T$ is less than zero then, in step S31, the processor 28 selects sample T+1 and sets the value of S equal to the value of T and subsequently increases the value of T by 1. The process then returns to step S15 and continues until the sample overlay stored in the sample decoder 64 whose phase most closely matches that of the signal input to the ADC 60 has been identified.

Figure 8:
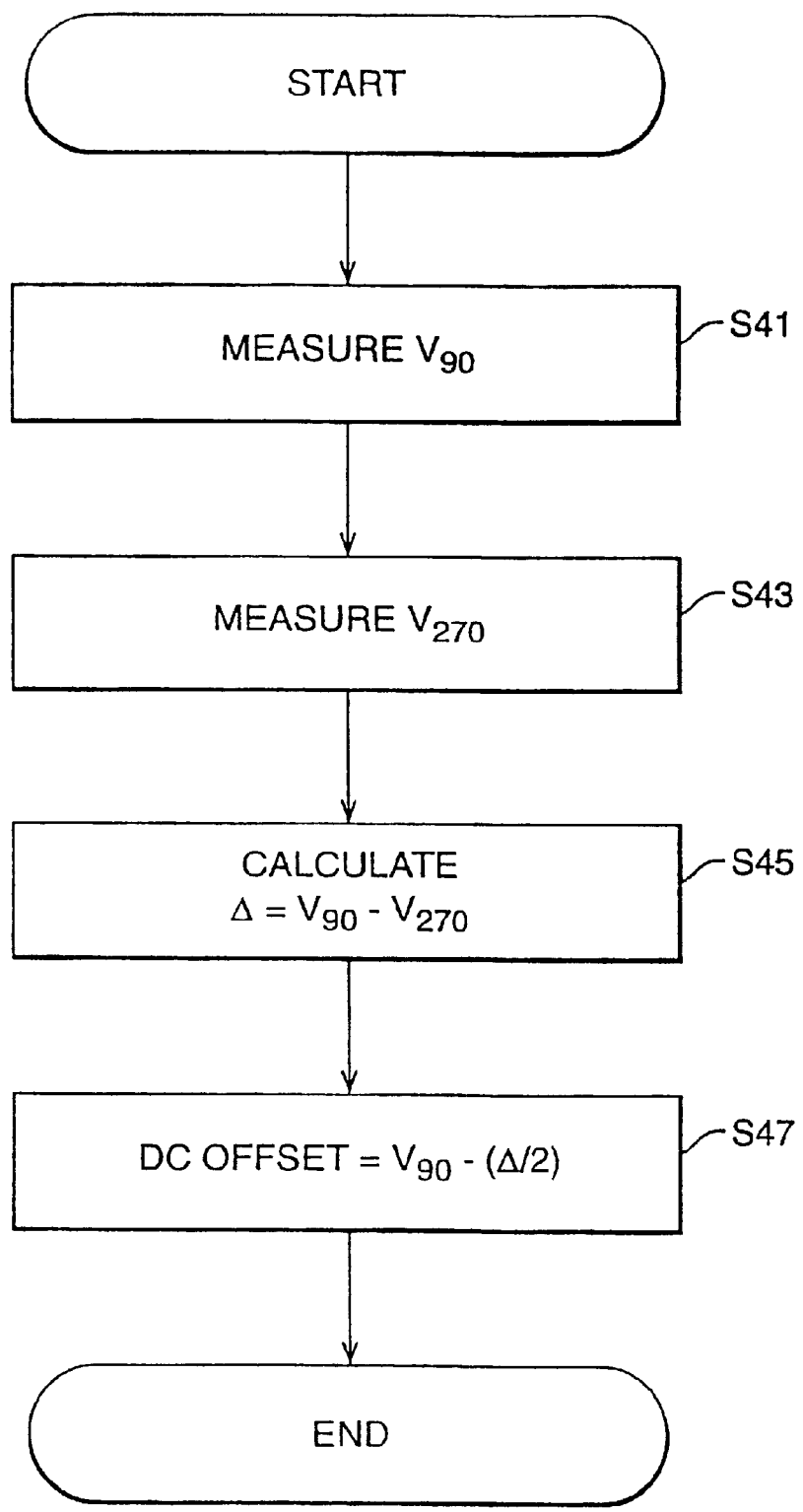
FIG. 8 is a flow chart indicating a routine used in the first embodiment of the present invention to remove any DC offset in a signal input into the analogue-to-digital converter.

A DC component to the signal input to the ADC 60 will also cause inaccuracy in the measurement value. As shown in FIG. 8, the steps of the "calculate DC offset" sub-routine are as follows.

In step S41 the processor 28 samples the value, $V_{90}$, of the output of the ADC 60 when the sample decoder 64 indicates that the phase of the selected sample overlay passes through 90°. In step S43 the processor 28 samples the value, $V_{270}$, of the ADC 60 when the sample decoder 64 indicates that the phase of the selected sample overlay passes through 270°. The difference $\Delta$ between $V_{90}$ and $V_{270}$ is then calculated in step S45 and the DC offset value is obtained in step S47 by subtracting half the value of $\Delta$ from $V_{90}$.

The "calculate DC offset" sub-routine is run periodically to check if there have been any fluctuations in the DC level of the signal input to the ADC 60.

The value of the phase shift between the output of the DAC 36 and the signal input to the ADC 60 will vary significantly if the position of the movable I-shaped core 46 in relation to the E-shaped cores 42, 44 moves outside a certain range. Therefore, in this embodiment, the routine for identifying the sample overlay stored in the sample decoder 64 having the closest phase relationship with the input to the ADC 60 is run whenever the displacement of the movable I-shaped core 46 passes through pre-determined points where the change in phase shift becomes significant.

The reference value output from the difference circuit 56 is also monitored, using the "Check Amplitude of $V_{Ref}$" sub-routine 73, to check if there have been any fluctuations in the amplitude of the output of the DAC 36.

Accordingly, the steps of the "measure surface" sub-routine 74 include measuring the characteristic of the surface by sampling the ADC 60 when the sample decoder 64 indicates that the phase of the selected sample overlay passes through 90° and:

i) periodically checking the reference value output from the difference circuit 56;

ii) periodically running the "calculate DC offset" sub-routine 72; and iii) running the "identify sample overlay" sub-routine 70 whenever the I-shaped core passes through one of the predetermined points.

In this embodiment the point at which the ADC 60 is sampled is when the phase of the sinusoidal signal is equal to 90°, P90 in FIG. 6, and hence the sinusoidal signal is at its peak.

There will now be described a second embodiment of the present invention. A problem which may occur with the transducer circuit of the first embodiment of the present invention is that noise on the signal input to the ADC 60 due to electrical pick-up and inherent component noise may lead to an incorrect sample overlay stored in the sample decoder 64 being identified and may also lead to errors in the measurement signal.

The solution proposed in the present embodiment is to sample the signal at the same point in a number of cycles and then calculate the total value obtained by adding the sampled values. This is possible when the rate of change of the characteristic of the surface being measured is slow compared with the frequency of the oscillator which is generally the case where surface roughness or texture is being measured.

The transducer circuit according to the second embodiment of the present invention is substantially identical to that of the first embodiment with the exception that the processor 28, when sampling the ADC 60 when the sample decoder 64 indicates that the currently selected sample overlay passes through a given phase, samples the ADC 60 on a plurality of cycles of the signal input to the ADC 60 and adds together the values of the samples. The value obtained by adding the samples is directly converted by the processor 28 into a measurement of the z-position of the stylus using an appropriate conversion look-up table.

The multiple measurement technique described above may be used any time the processor 28 samples a value output from the ADC 60, for example during surface measurement, the "identify sample overlay" sub-routine and the "calculate DC offset" sub-routine.

Figure 9:
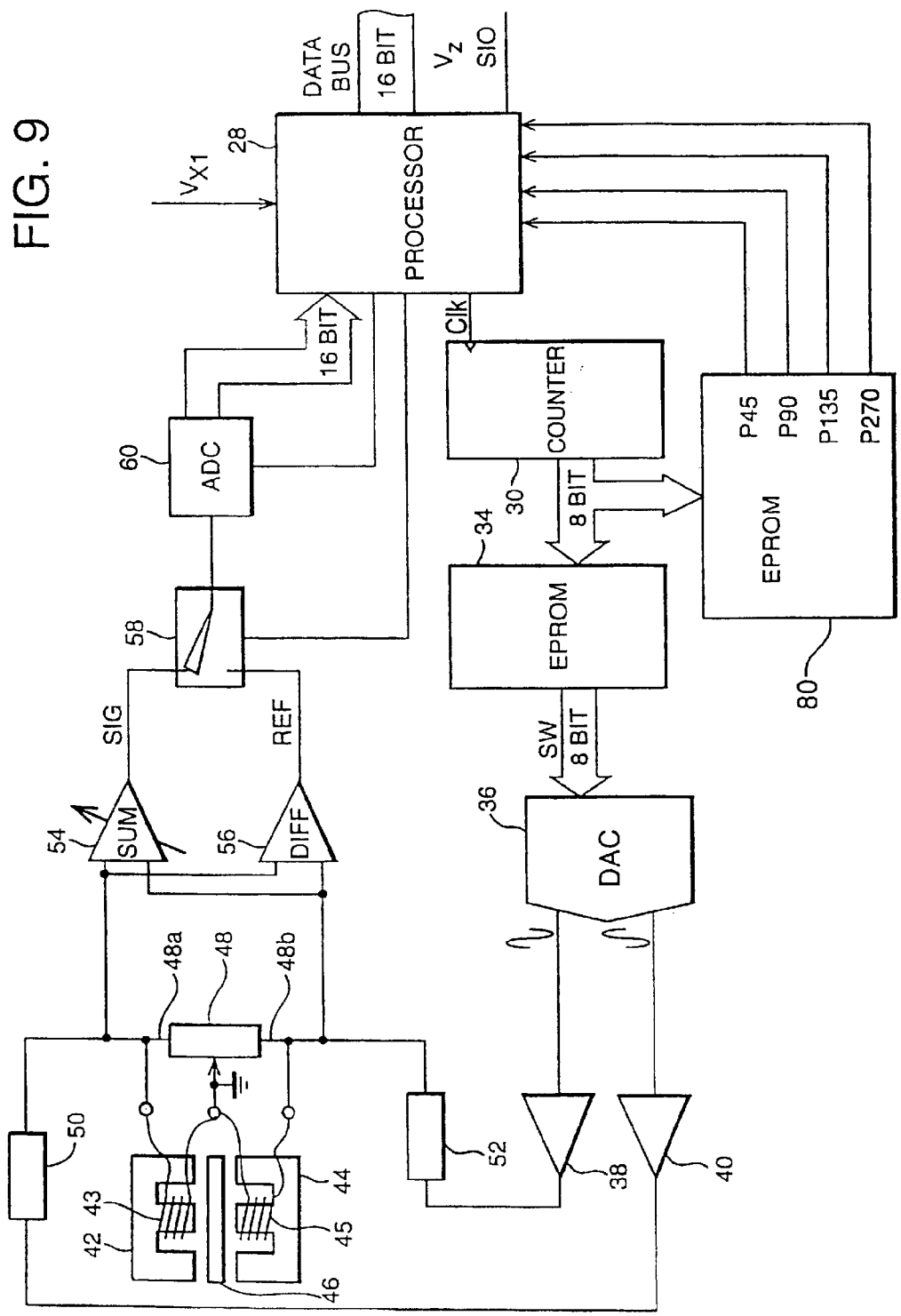
FIG. 9 is a block diagram in accordance with a third embodiment of a transducer circuit according to the present invention.

A third embodiment of the present invention will now be described with reference to FIG. 9. In FIG. 9 components that are identical to the corresponding components in FIG. 4 have been numbered with the same numerals. The main difference is in the replacement of the sample decoder 64 by an EPROM 80 which stores only phase information for the digital sine wave stored in the EPROM 34 and outputs to the processor a signal when the output of the EPROM 34 passes through 45°, 90°, 135° and 270°.

In this embodiment, rather than finding a sample overlay whose phase matches the phase of the signal input to the ADC 60, two points of the signal input to the ADC 60 having a known phase relationship are sampled when carrying out measurements. In this embodiment, the two points are when the phase of the digital sine wave output from the EPROM 34 passes through 45° and 135°, points P1 and P2 in FIG. 6.

Therefore, the "identify sample overlay" sub-routine 70 is not required in this embodiment, but rather the "measure surface" sub-routine 74 is modified as described below.

Assuming that there is a phase shift of x° between the output of the EPROM 34 and the input to the ADC 60, then:

$$V_{P45} = V_{pk} \sin(45+x) \quad (1)$$

where $V_{P45}$ is the value sampled from the ADC 60 when the EPROM 80 indicates that the phase of the output from the EPROM 34 passes through 45°, and $V_{pk}$ is the peak value of the signal input to the ADC 60. By expanding out the sine term, this is equivalent to:

$$V_{P45} = V_{pk}\left(\frac{\sin x}{\sqrt{2}} + \frac{\cos x}{\sqrt{2}}\right) \quad (2)$$

Similarly:

$$V_{P135} = V_{pk} \sin(135+x) \quad (3)$$

where $V_{P135}$ is the value sampled from the ADC 60 when the EPROM 80 indicates that the phase of the output of the EPROM 34 passes through 135°, the sine term being expandable to give:

$$V_{P135} = V_{pk}\left(-\frac{\sin x}{\sqrt{2}} + \frac{\cos x}{\sqrt{2}}\right) \quad (4)$$

From equations 2 and 4 the following relations can be derived:

$$\sin x = \frac{V_{P45} - V_{P135}}{\sqrt{2} V_{pk}} \quad (5)$$

$$\cos x = \frac{V_{P45} + V_{P135}}{\sqrt{2} V_{pk}} \quad (6)$$

By squaring and adding equation 5 and equation 6, the following relationship is obtained:

$$\frac{V_{P45}^2 + V_{P135}^2}{V_{pk}^2} = 1 \quad (7)$$

From equation 7, the following expression for $V_{pk}$ can be derived:

$$V_{pk} = \sqrt{V_{P45}^2 + V_{P135}^2} \quad (8)$$

As the peak value is calculated by taking the square root of a number, the sign of the peak value can not be derived from equation 8. To overcome this, the values of $V_{P45}$ and $V_{P135}$ can be taken into account. If the values of $V_{P45}$ and $V_{P135}$ are higher than the DC offset level then the sign of $V_{pk}$ is positive while if the signs of $V_{P45}$ and $V_{P135}$ are lower than the DC offset level then the sign of $V_{pk}$ is negative. In practice, the phase shift between the output of the DAC 36 and the signal input to the ADC 60 does not vary sufficiently for $V_{P45}$ and $V_{P135}$ to have amplitudes on opposite sides of the DC offset level.

To calculate the any DC offset level in the signal input to the ADC 60, the same routine as used in embodiment 1 and shown in FIG. 7 may be employed with the phase information stored in the EPROM 80 being used instead of the phase information of the selected sample overlay.

Therefore, the "measure surfaces" sub-routine used in the third embodiment includes sampling the ADC 60 when the EPROM 80 indicates that the output of the EPROM 34 corresponds to a phase of 45°, sampling the ADC 60 when the output of the EPROM 80 indicates that the output of the EPROM 34 corresponds to a phase of 135° and calculating, based on these values, the correct value of $V_{PK}$.

The third embodiment has the advantage that the EPROM 80 requires less memory and is therefore cheaper than the sample decoder 64 of the first embodiment. However, compared with the first embodiment it has the disadvantage that when taking measurements the signal input to the ADC 60 must be sampled at two points with different phase relationships and the processor 28 must carry out additional processing compared with the first embodiment. This may reduce the number of transducer circuits which can be controlled by a single processor 28 having a given processing power.

It will be appreciated that, as in the second embodiment, the points may be sampled a number of times and arranged to reduce the effects of noise.

Figure 10:
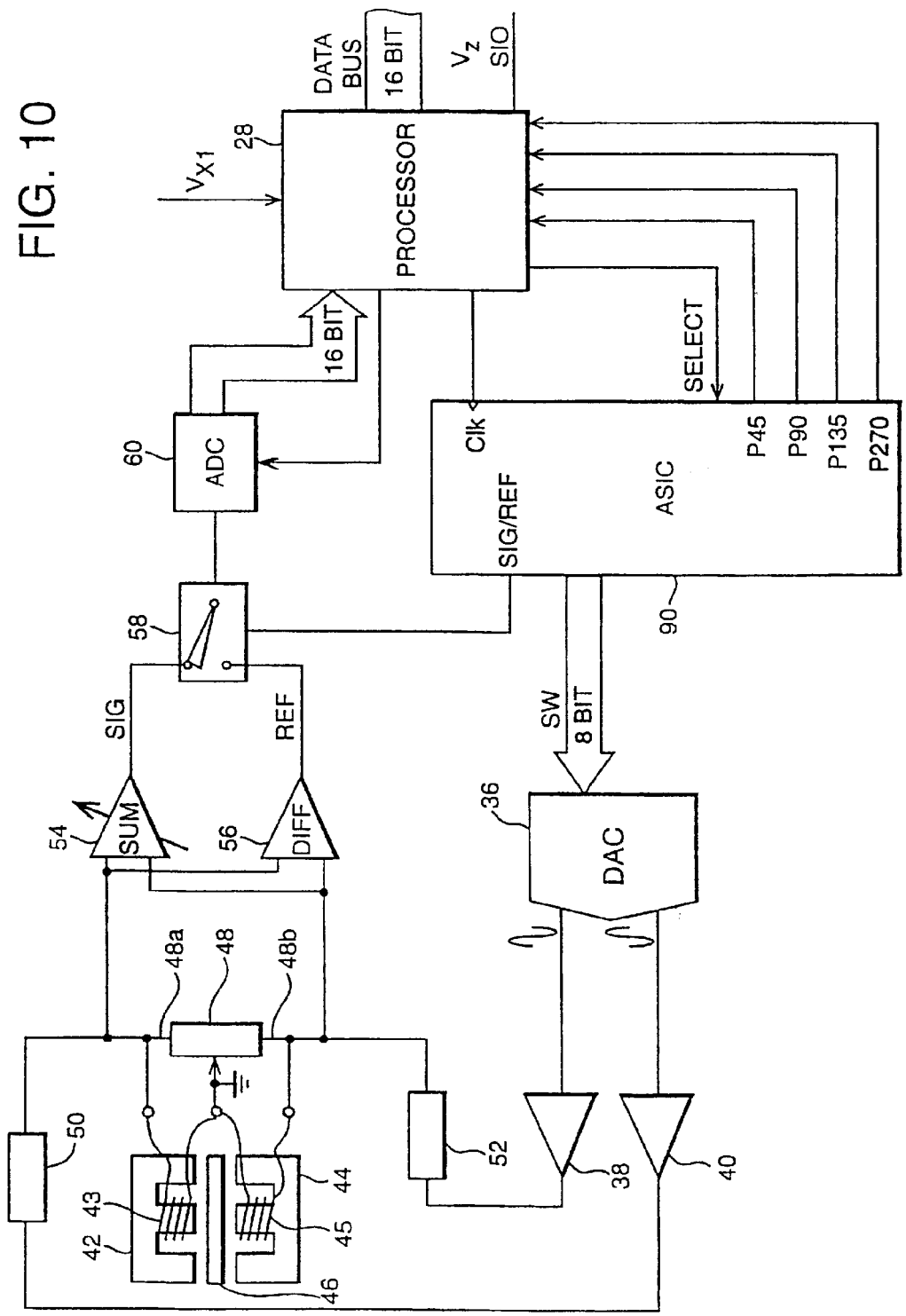
FIG. 10 is a block diagram in accordance with a fourth embodiment of a transducer circuit according to the present invention.

A fourth embodiment of the present invention will now be described with reference to FIG. 10. In FIG. 10, components which are identical to corresponding components in the first embodiment as shown in FIG. 4 are identified by the same numerals as in FIG. 4.

In the fourth embodiment of the present invention the counter 30, EPROM 34, and sample decoder 64 of the first embodiment have all been incorporated in an application specific integrated circuit (ASIC) 90, thereby reducing the number of components in the circuit. The ASIC 90 performs exactly the same function as the components of the first embodiment which the ASIC 90 replaces.

Similarly, the ASIC 90 could perform the functions of the counter 30, EPROM 34, and EPROM 80 of the third embodiment of the present invention.

The use of the ASIC 90 to replace a number of components has the advantage of reducing the number of components and thereby enabling the circuit to be made smaller and cheaper. Additionally by using the ASIC 90 to replace a number of components has the advantage of reducing noise as there are less digital circuits. The ASIC 90 also allows for easy modification.

Figure 11:
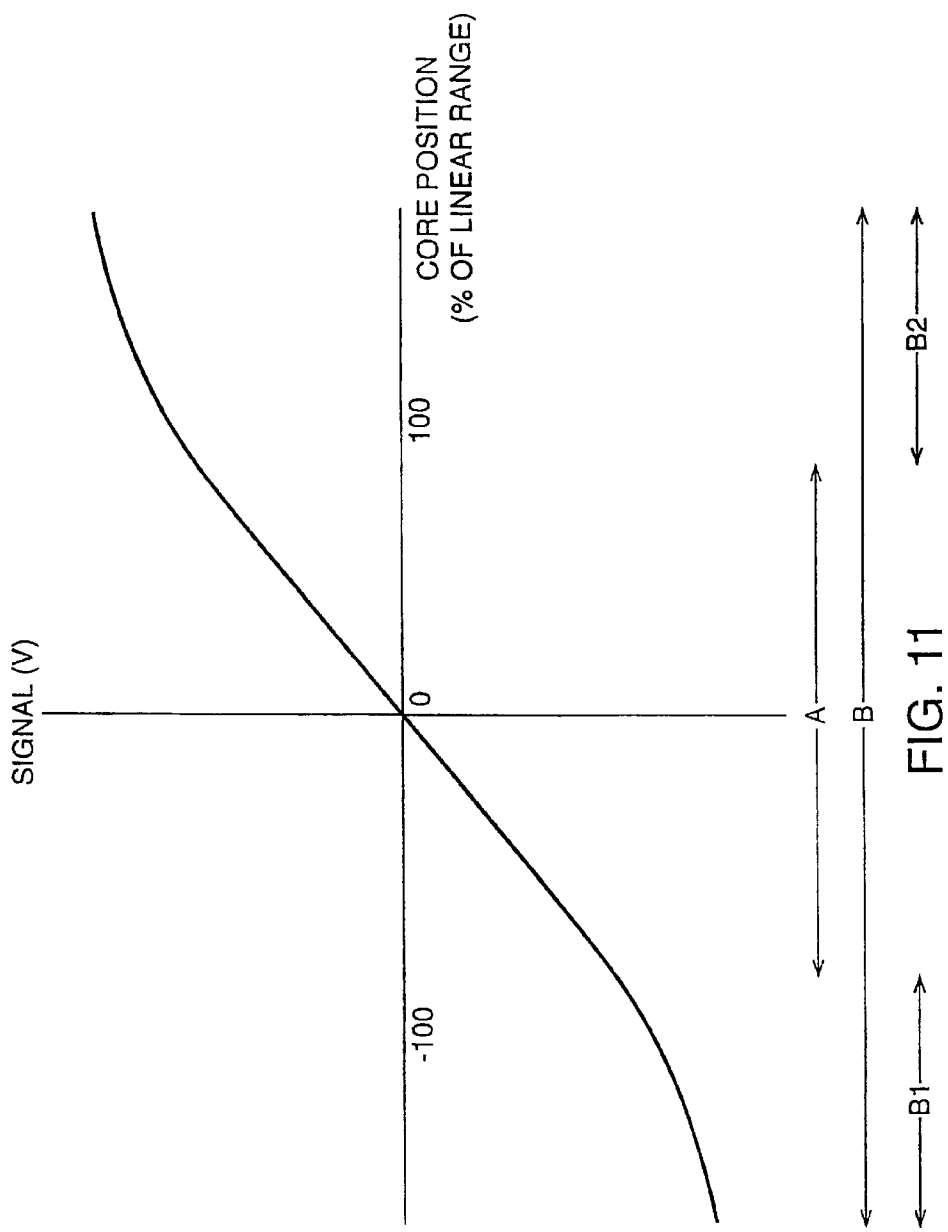
FIG. 11 is a graph showing the amplitude of a signal input to an analogue-to-digital converter of an embodiments of the present invention against the relative displacement of the core of the inductive transducer.

As indicated in FIG. 11, the transducer used in the previous embodiments is conventionally used within a range A in which there is a linear relationship between the voltage input to the ADC 60 and the displacement of the I-shaped core 46 from the position in which the bridge circuit is balanced. The working range for the displacement of the I-shaped core 46 can be extended to a range B including additional regions B1 and B2 where there is a non-linear response in the signal input to the ADC 60 by carrying out a calibration procedure. However, when the range of measurement is extended there will be a corresponding reduction in measurement resolution if the same number of values of the output from the ADC 60 must cover the extended range. Furthermore, in the range B the phase shift between the oscillating voltage signal $V_{OSC}$ and the input to the ADC 60 will vary significantly.

In a fifth embodiment of the present invention, the processor 32 also stores an "initialisation" or calibration sub-routine which is activated when either the metrological instrument is switched on or a manual command is received from a user and which enables, if desired, the transducer to be operated outside its normal linear range as described above. The transducer circuit of the fifth embodiment of the present invention is essentially identical to that of the first embodiment of the present invention with the addition of the "initialisation" sub-routine.

In the "initialisation" sub-routine the position of the I-shaped core 46 is moved step by step throughout an extended range using a reference sample having a known well-defined shape to its surface 2. At each step, the processor runs the "identify sample overlay" sub-routine 70, the "calculate DC offset" sub-routine 72, the "Check Amplitude of $V_{Ref}$" sub-routine 73, and obtains a measurement corresponding to the position of the I-shaped core using the "measure surface" sub-routine 74 at a number of known z displacements positions. This information may be stored as a look-up table in the memory 1006 so that the master controller 1000 can determine what z displacement is represented by a given output signal from the z-position transducer circuit.

In this embodiment two modes of operation are available to the user, a first mode in which the movement of the I-shaped core 46 is limited to the substantially linear range and a second mode in which the movement of the I-shaped core 46 can be over the entire extended range but the measurement is produced with a reduced resolution.

Because the phase shift between the oscillating voltage signal $V_{OSC}$ and the input to the ADC 60 will vary more rapidly in the extended range B, the transducer circuit according to the present invention is particularly advantageous since the phase shift between the oscillating voltage signal $V_{OSC}$ and the input to the ADC 60 can be constantly monitored so that, even in the extended range B, the input to the ADC 60 is always sampled at the same phase value.

A number of modifications can be made to the above-described embodiments without departing from the inventive concept of the invention. Some of these modifications will now be described.

In all the previous embodiments the transducer has been an inductive transducer formed by an I-shaped core 46 and two E-shaped cores 42, 44 with wire coiled around the central projection of each of the E-shaped cores 42, 44. However, the present invention can be applied equally to any other form of inductive transducer and also to other transducers such as capacitive transducers.

Figure 12:
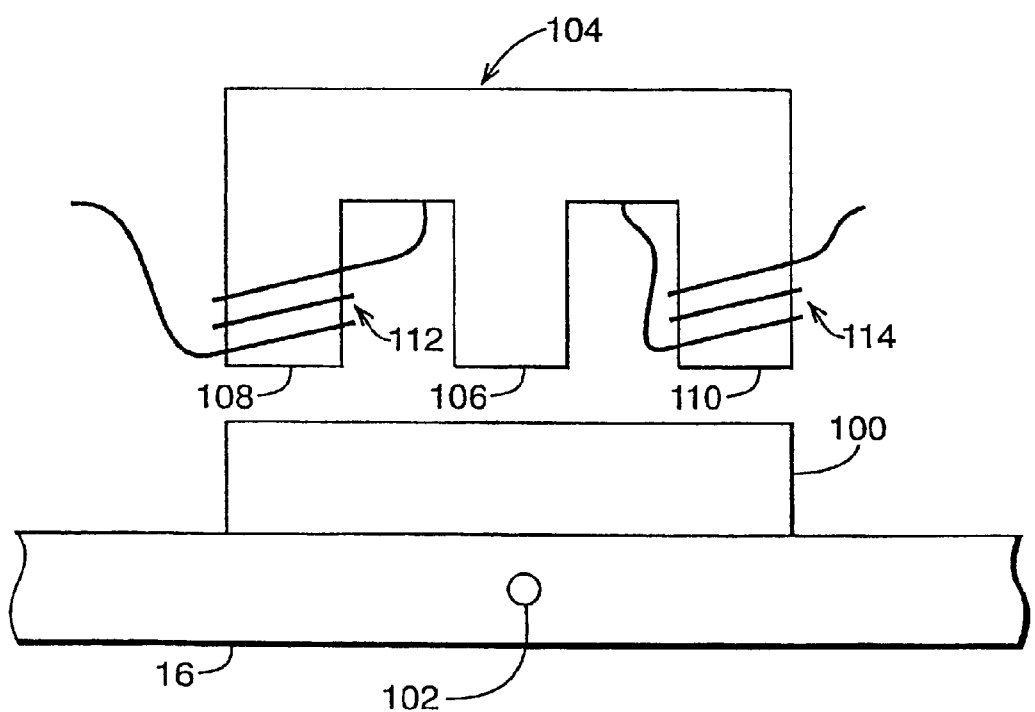
FIG. 12 is a schematic diagram illustrating an alternative variable inductive transducer.

An example of an alternative variable inductive transducer is shown in FIG. 12. An I-shaped core 100 (that is a core having only a backbone) is connected to the stylus arm 16 such that it is aligned longitudinally along the stylus arm 16. The centre of the I-shaped core 100 is located directly adjacent the pivot point 102 of the stylus arm 16.

An E-shaped core 104 (that is a core having a backbone with three equally spaced fingers 106, 108, 110 projecting therefrom) is located opposite to the I-shaped core 100 with the projections facing one of the elongate surfaces of the I-shaped core 100. The central projection 106 is disposed opposite the pivot point 102 and coils 112, 114 are wrapped around respective ones of the two outer projections 108, 110. This variable inductive transducer has the advantages of low cost, as only one E-shaped core is required, and compactness. Although it is advantageous to locate the I-shaped core 100 symmetrically about the pivot point 16, since the stylus is then able to move the largest distance in the z-direction before the I-shaped core 100 makes contact with the E-shaped core 104, the I-shaped core 100 may also be mounted away from the pivot point.

Another common feature of all the previously described embodiments is that a switch 58 is used to select either the output of the sum circuit $V_{Sig}$ or the output of the difference circuit $V_{Ref}$ as the input to the ADC 60. Alternatively, a second ADC could be added and the output of the sum circuit $V_{Sig}$ and the output of the difference circuit $V_{Ref}$ can be input to respective ones of the two ADCs. Alternatively as the amplitude of $V_{Ref}$ should remain substantially constant, the output of the sum circuit $V_{Sig}$ can be fed directly into the ADC 60 and the difference circuit 56 and the switch 58 can be removed. In this case, a measurement proceeds on the assumption that the value of the amplitude of $V_{Ref}$ is a constant.

A further common feature of all the previously described embodiments is that the clock is incorporated in the processor 28. Alternatively, a separate clock could be used. The clock frequency may be varied to vary the frequency of the voltages output from the DAC 36.

The DAC 36 of the previously described embodiments converts an 8 bit number into two corresponding analogue signals, one with an amplitude equivalent to the 8 bit number and one with an amplitude equivalent to the negative of the 8 bit number. It will be appreciated that the inventive concept could equally well be applied to other word sizes for example 16 bit and 32 bit. Similarly, the output of the counter 30 can be of different word sizes. Also, clock frequencies other than 2.5 MHz can be used. One of the advantages of the present invention is the ease in which the components can be upgraded as new and better components enter onto the market.

In the first embodiment, a counter 30 is used to output an 8-bit number, the value of which increments up by one each time a clock signal Clk is received from the processor 28. This 8-bit number is then used to trigger a change in the value of the digitised sine wave signal SW. Therefore the value of the digitised sine wave signal SW changes approximately every 1.4°. Further, the sample decoder 64 stores sample overlays consisting of timing information for a respective different one of 64 sine waves having the same frequency as the sine wave stored in the EPROM 34 but successively phase shifted by 1.4°. In this way, the information of 64 sine waves having phase shifts in the range of −45° to +45° compared to the phase of the digitised sine wave signal SW are stored in the sample decoder 64.

Alternatively, the counter 30 could produce a 10-bit number, the most significant eight bits of which are used to address the EPROM 34 similar to the first embodiment, but all ten bits of which are used to address the sample decoder. Then, the sample decoder 64 may store sample overlays each of which consists of timing information for respective different one of 64 sine waves having the same frequency as the sine wave stored in the EPROM 34 but successively phase shifted by 0.35°. In other words, it is not necessary that the phase difference between the sine waves stored in the sample decoder 64 be equal to the phase difference corresponding to the time for which the digitised sine wave signal SW is constant.

In addition, the digital sine wave may not be generated by the technique used in the previously described embodiments. For example, the digital sine wave may be generated directly by a processor using software.

The points chosen for sampling the ADC 60 in the previous embodiments are examples only. In the first embodiment, for identifying the correct sample overlay it is only necessary to pick two phases where the magnitude of the sine wave should be identical. If the DC offset is calculated before the correct sample overlay is identified, it is even possible to use two phases for which the modulus of the amplitude of the sine wave is identical.

In addition, the first embodiment can be adjusted so that the sample decoder 64 need only notify the processor 28 when the phase of the selected sample overlay passes through three points. In this case, for example, the sample decoder 64 indicates when the selected sample overlay passes through 45° and 135° to identify the correct sample overlay, when the selected sample overlay passes through 45° and 225° to calculate the DC offset, and when the sample overlay passes through 45° to measure the characteristic of the surface.

It will be further appreciated that it is not necessary to use a sine wave at all. The important feature is that the DAC 36 produces an analogue signal having a periodically varying voltage whose amplitude varies continuously in a well known manner.

As mentioned in the first embodiment, the processor 28 can be connected to a host computer via an optical fibre link. A number of other links may be used. For example, it may be preferable to use an infra-red link in some situations where it is not desirable to have a direct connection between the metrological instrument and the host computer.

An embodiment will now be described with reference to FIGS. 13 and 14 in which a traverse unit 2000 communicates with a control unit 2100 using an infra-red link.

Figure 13:
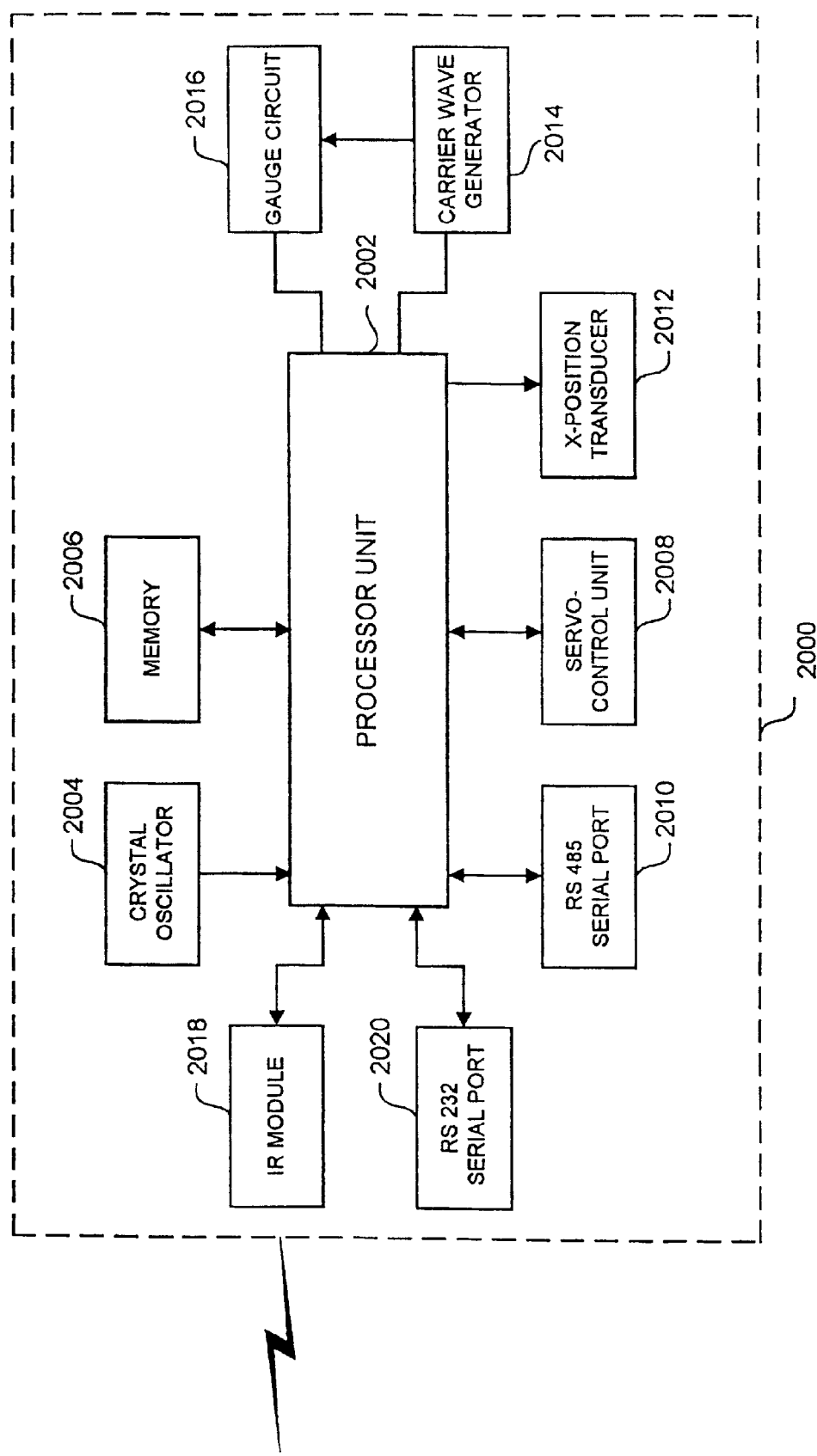
FIG. 13 is a block diagram of a traverse unit in accordance with a further embodiment of the invention.

As shown in FIG. 13, the traverse unit 2000 includes a processor unit 2002 to which is connected a crystal oscillator 2004 for providing a reference timing signal and a memory 2006 for storing operational instructions and data. In this embodiment, the processor unit 2002 is an AMD Elan SC 400 single chip PC micro-controller. This chip incorporates both an Intel 80486 100 MHz processor and memory storing instructions to enable the computer to communicate with, for example, a display and a keyboard. This type of chip has been used, for example, in personal organisers such as the Psion 5 series and mobile phones and has the advantage of reducing the size and cost of systems which do not require a high level of processing power.

The processor unit 2002 is programmed to carry out the functions carried out by the master controller 1000 illustrated in FIG. 2 and the processor 28 of the Z-position transducer illustrated in FIG. 3.

The traverse unit 2000 further includes a servo-control unit 2008 which is connected to the processor unit 2002 for, under the control of the processor unit 2002, causing movement of the stylus tip in the X-direction. Additionally, the traverse unit 2000 can be mounted on an external apparatus (not shown) including a motor which can move the traverse unit 2000 in the Z-direction. In such a case, the processor unit 2002 controls the movement in the Z-direction by sending signals to the motor of the external apparatus via an RS 485 serial port 2010. Thus, X and Z direction movement is possible, as is the case for the embodiment illustrated in FIG. 1.

An X-position transducer 2012, a carrier wave generator 2014 and a gauge circuit 2016 which correspond to the similarly named components described with reference to FIGS. 2 and 3 are also connected to the processor unit 2002.

The processor unit 2002 is also connected to an IR module 2018 via which infra-red signals can be sent to the control unit 2100. An RS 232 serial port 2020 is connected to the processor unit 2002 into which a connector wire (not shown) can be inserted. This connector wire provides a back-up link between the control unit and the traverse unit. Further, in some circumstances the control unit and traverse unit will be positioned such that there is no line-of-sight between them and therefore data can not be communicated via the IR link. In this situation, the connector wire allows the traverse unit 2000 to be controlled by the control unit 2100.

Figure 14:
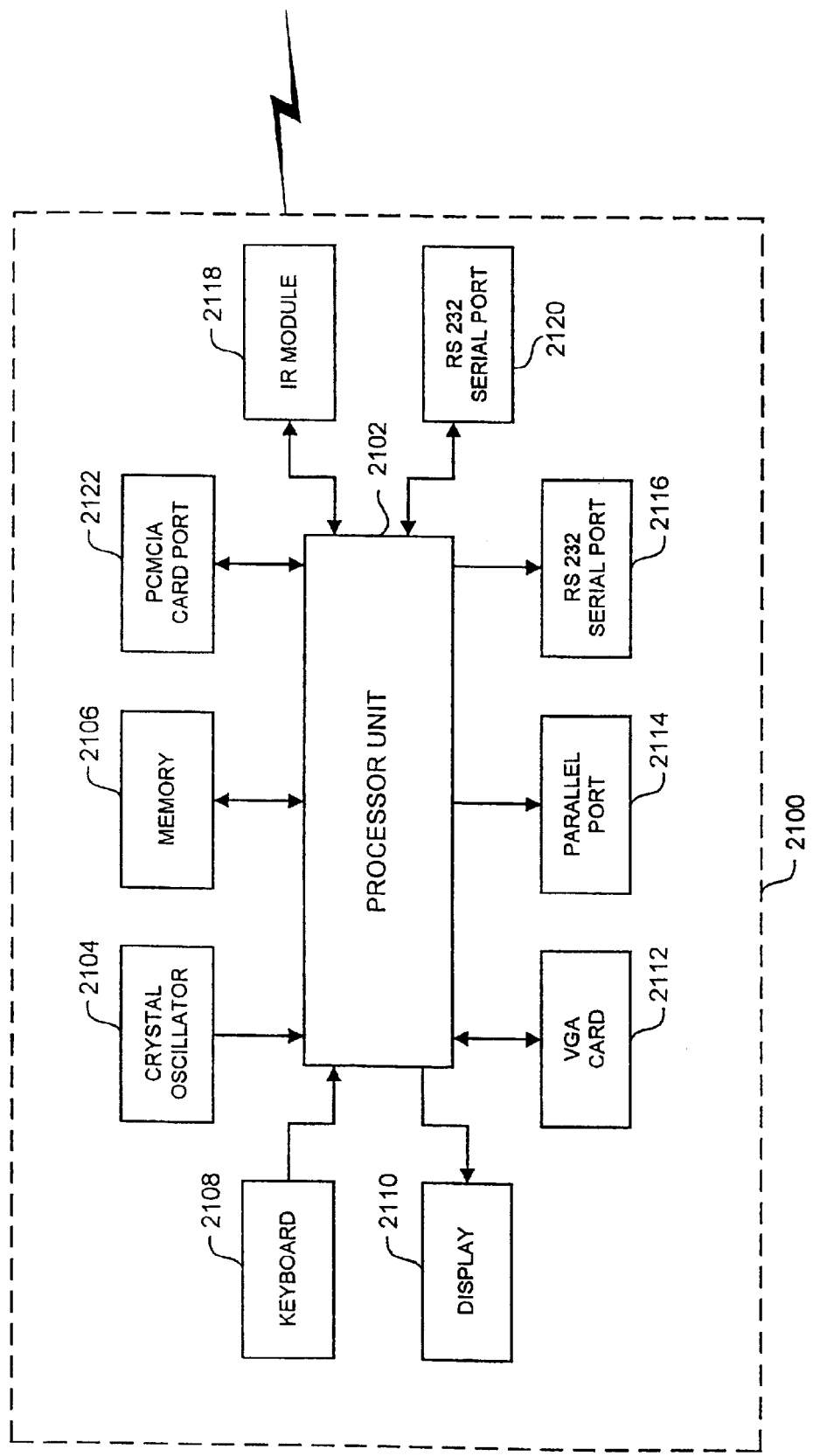
FIG. 14 is a block diagram of a control unit for use with the traverse unit illustrated in FIG. 13.

As shown in FIG. 14, the control unit 2100 includes a processor unit 2102 which in this embodiment is the same type of processor unit as that used in the traverse unit 2000, i.e. an AMD Elan SC 400. The processor unit 2102 is connected to a crystal oscillator 2104 which provides a reference timing signal and a memory 2106 which stores operational instructions and data. The processor unit 2102 is also connected to a keyboard 2108 via which a user can input instructions and a display 2110 for displaying information to the user. As mentioned above with relation to the traverse unit 2000, the memory of the processor unit 2102 stores operational instructions enabling the processor unit 2102 to communicate with the keyboard 2108. In this embodiment, the display 2110 is a 640×480 LCD colour display and a VGA card 2112 is connected to the processor unit 2102 via an expansion bus to provide operational instructions to enable the processor unit 2102 to communicate with the display 2110.

The processor unit 2102 is also connected to a parallel port 2114 and a RS 232 serial port 2116, which provide for respective connection to an external parallel and series connection printer. As in the traverse unit 2000, the processor unit 2102 of the control unit 2100 is connected to an IR module 2118 and a RS 232 serial port 2120 to allow for communication between the control unit 2100 and the traverse unit 2000.

The processor unit 2102 of the control unit 2100 is also connected to a PCMCIA card port 2122 into which a PCMCIA card (not shown) can be inserted. Thus, data can be stored onto the PCMCIA card and transferred to a personal computer or computer network.

In operation, a user inputs instructions to the control unit 2100 via the keyboard 2108 to initiate a measurement. The processor unit 2102 of the control unit 2100 sends a signal to the processor unit 2002 of the traverse unit 2000 via the IR modules 2118 and 2018 to initiate a measurement. The processor unit 2002 then controls the measurement as described in the previous embodiments and sends the data back to the processor unit 2102 via the IR modules 2018 and 2118. The results of the measurement are then shown on the display 2110. The results of the measurement can also be printed out by connecting a printer to either the parallel port 2114 or the serial port 2116 of the control unit 2100, or alternatively saved onto a PCMCIA card inserted in the PCMCIA card port 2122.

Optionally, the traverse unit 2000 may include an expansion bus via which it can be connected to either a personal computer or, via a modem, to the internet or other network. In this case the control unit is not needed and user instructions can be sent directly from the personal computer or over the internet or other network.

The keyboard 2108 and display 2110 may be replaced by a touch-screen display via which information can be shown to the user and the user can input instructions.

It will be appreciated that the components of the embodiment described with reference to FIGS. 13 and 14 could be replaced by functionally equivalent components. For example, the processor unit could be any of a number of commercially available chips, or could be a custom-built chip. Further, the serial and/or parallel ports could adopt standards different to those quoted.

In the first embodiment, a pattern recognition process is essentially being carried out. The processor 28 identifies the sample overlay corresponding to the sine wave (pattern) stored in the sample decoder 64 which most closely matches the input to the ADC 60. It will be recognised that such pattern recognition may be carried out entirely in software, which can either be loaded from a floppy disk, CD-ROM or the like or downloaded as a signal from the internet or other network, in the processor 28. In this case, there is no need for the sample decoder 64.

Processor units as described with reference to the embodiment described in FIGS. 13 and 14 have been developed for mobile telephones. Some of these processor units incorporate a digital-to-analogue convertor and an analogue-to-digital convertor. For such processor units there is no need for either a separate analogue-to-digital converter in the gauge circuit or, when the pattern recognition is carried out by software, a separate carrier wave generation circuit as the digital-to-analogue convertor can be used to generate the carrier wave.

For the case where the rate of change of the characteristic of the surface being measured is small compared to the frequency of the signal $V_{OSC}$ output from the DAC 36, it is not necessary to compare points on the same cycle when comparing values sampled from the ADC 60 when the phase of the signal input to the ADC 60 passes through different values. For example, in the "identify sample overlay" 70 of the first embodiment, the value of the output of the ADC 60 when the sample decoder 64 indicates that the phase of the selected sample passes through 45° in one cycle can be compared with the value of the output of the ADC 60 when the sample decoder 64 indicates that the phase of the selected sample passes through 135° for a neighbouring cycle.

The previously described embodiments have been related to a metrological instrument in which a stylus 18 is mounted on an arm 16. The arm 16 is pivotally attached to the second carriage 14 and movement of the stylus 18 causes a corresponding relative movement between a core 46 in a coil 42, 44. The previously described embodiments could equally be applied to a metrological instrument where the movement of the arm 16 is axial rather than pivotal.

In addition, the metrological instrument could be for measuring roundness like, for example, the Talyrond series manufactured by Taylor Hobson Limited, Leicester, England, UK, rather than surface texture.

Alternatively, the transducer circuit of the present invention could be used in a pressure sensing system as described in, for example, U.S. Pat. No. 4,140,998.

What is claimed is:

1. A transducer circuit for providing a measurement signal indicative of a displacement of a probe as it follows a measurement surface, comprising:
    an excitation signal generator operable to generate an excitation signal having an amplitude which varies with time in a predetermined manner;
    a transducer operable to provide, in response to the excitation signal, an output signal which changes with displacement of the probe as the probe follows the measurement surface;
    a processor operable to compare information relating to the excitation signal from the excitation signal generator with the output signal of the transducer to determine a phase difference between the output signal from the transducer and the excitation signal, to compensate for the phase difference, and to determine the displacement of the probe from the output signal after compensating for the phase difference; and
    a phase signal generator for producing a first phase signal indicating when the phase of the excitation signal passes through a first predetermined value.

2. A transducer circuit according to claim 1, wherein the excitation signal generator is operable to provide the excitation signal with a sinusoidal variation in amplitude.

3. A transducer circuit according to claim 1, wherein the processor is operable to sample the electrical signal in response to the first phase signal provided by the phase signal generator.

4. A circuit according to claim 3, further comprising an analogue-to-digital converter operable to convert the electrical signal into a digital signal before the electrical signal is sampled by the processor.

5. A transducer circuit according to claim 1 or 3, wherein the phase signal generator is operable to output a second phase signal when the phase of the excitation signal passes through a second predetermined value different from the first predetermined value.

6. A transducer circuit according to claim 5, wherein the processor is operable to correct for the phase shift between the excitation signal and the electrical signal by comparing a first value of the electrical signal, sampled in response to the first phase signal, and a second value of the electrical signal, sampled in response to the second phase signal.

7. A transducer circuit according to claim 6, wherein the first predetermined value of the phase is 45° and the second predetermined value of the phase is 135°.

8. A transducer circuit according to claim 7, wherein the processor is operable to calculate a sum of the square of the first value and the square of the second value, the sum thereby having a value that is independent of the phase shift between the output signal and the electrical signal.

9. A transducer circuit according to claim 6, wherein the processor is operable to calculate a sum of the square of the first value and the square of the second value, the sum thereby having a value that is independent of the phase shift between the output signal and the electrical signal.

10. A control circuit for use with a transducer for converting a position of a probe into a corresponding electrical signal, comprising:
    an excitation signal generator for providing to the transducer an excitation signal whose voltage varies in a known manner with time; and
    a processor for analysing an electrical signal from the transducer, the electrical signal having a phase, to generate a measurement signal providing a measurement of the position of the probe;

wherein the processor is adapted to calculate the phase of the electrical signal by comparing the electrical signal with information about a plurality of patterns, each corresponding to a different phase, and identifying the pattern whose corresponding phase most closely matches the phase of the electrical signal, and wherein the processor is operable to sample a value of the electrical signal when the phase of the pattern whose phase most closely matches the phase of the electrical signal passes through a predetermined value.

11. A transducer circuit for use with a transducer for converting a position of a probe into an electrical signal dependent on the probe position, comprising:

a clock for producing a train of clock signals at defined intervals;

a sub-circuit for providing an analogue signal, the analogue signal having a voltage which varies periodically in accordance with the train of clock signals, to the transducer;

an analogue-to-digital converter for converting the electrical signal into a digital signal; and a processor for analysing signals received from the sub-circuit and the analogue-to-digital converter to provide a measurement signal providing a measurement of the position of the probe, wherein the processor is adapted to correct for a phase shift between the analogue signal and the electrical signal in accordance with information received from the sub-circuit and the analogue-to-digital converter, and wherein the sub-circuit is operable to produce a first phase signal indicating when the analogue signal has a phase corresponding to a first predetermined value.

12. A transducer circuit according to claim 11, wherein the clock is a crystal oscillator.

13. A transducer circuit according to claim 12, wherein the crystal oscillator is an integral part of the processor.

14. A transducer circuit according to claim 11, wherein the sub-circuit is operable to provide the analogue signal so that the voltage of the analogue signal varies sinusoidally.

15. A transducer circuit according to claim 11, wherein the processor is operable to sample the digital signal in response to the first phase signal produced by the sub-circuit.

16. A transducer circuit according to either claim 11 or claim 15, wherein the sub-circuit is operable to produce a second phase signal when the analogue signal has a phase corresponding to a second predetermined value different from the first predetermined value.

17. A transducer circuit according to claim 16, wherein the processor is operable to correct for any phase shift between the analogue signal and the electrical signal by comparing a first value of the digital signal, sampled in response to the first phase signal, and a second value of the digital signal, sampled in response to the second phase signal.

18. A transducer circuit according to claim 17, wherein the first predetermined value of the phase is 45° and the second predetermined value of the phase is 135°.

19. A transducer circuit according to claim 17, wherein the processor is operable to calculate a sum of the first value squared and the second value squared, thereby obtaining a value that is independent of any phase shift between the analogue signal and the digital signal.

20. A transducer circuit for use with a transducer for converting a position of a probe into an electrical signal dependent on the probe position, comprising:

a clock for producing a train of clock signals at defined intervals;

a sub-circuit for providing an analogue signal, the analogue signal having a voltage which varies periodically in accordance with the train of clock signals, to the transducer;

an analogue-to-digital converter for converting the electrical signal into a digital signal; and a processor for analysing signals received from the sub-circuit and the analogue-to-digital converter to provide a measurement signal providing a measurement of the position of the probe, and wherein the processor is operable to compare phase information for the electrical signal with a plurality of reference signals, each reference signal having a corresponding phase, and to thereby identify the reference signal whose phase most closely matches that of the electrical signal.

21. A transducer circuit according to claim 20, wherein the processor is operable to sample a value of the digital signal output from the analogue-to-digital converter when the phase of the reference signal whose phase most closely matches that of the electrical signal passes through a predetermined value.

22. A transducer circuit according to claim 20, wherein the sub-circuit comprises:

a counter for outputting a first train of predetermined numbers whose values cycle, the value of the output predetermined number being increased by one in response to a clock signal received from the clock;

a memory containing a number of predetermined numbers stored in a number of memory locations identified by an address, the counter and the memory being arranged so that, in use, the output of the counter is input to the memory as the address of a memory location and the memory outputs the predetermined number stored in the memory location to form a second train of predetermined numbers whose values vary periodically; and a digital-to-analogue converter for converting the second train predetermined numbers into the electrical signal.

23. A metrological instrument for measuring a characteristic of a surface of a workpiece, the instrument comprising an arm for holding a stylus to be traversed relative to the surface of the workpiece and a transducer circuit for providing a measurement signal indicative of a displacement of the stylus, said transducer circuit comprising:

an excitation signal generator operable to generate an excitation signal with an amplitude which varies with time in a predetermined manner;

a transducer operable to provide, in response to the excitation signal, an output signal which changes with displacement of the stylus as the stylus follows the surface of the workpiece;

a processor operable to compare information relating to the excitation signal from the excitation signal generator with the output signal of the transducer to determine a phase difference between the output signal from the transducer and the excitation signal, to compensate for the phase difference, and to determine the displacement of the stylus from the output signal after compensating for the phase difference; and a phase signal generator for producing a first phase signal indicating when the phase of the excitation signal passes through a first predetermined value.

24. A metrological instrument according to claim 23, wherein the processor is operable to sample the electrical signal in response to the first phase signal provided by the phase signal generator.

25. A metrological instrument according to claim 24, further comprising an analogue-to-digital converter operable to convert the electrical signal into a digital signal before the electrical signal is sampled by the processor.

26. A metrological instrument according to claim 23 or 24, wherein the phase signal generator is operable to output a second phase signal when the phase of the excitation signal passes through a second predetermined value different from the first predetermined value.

27. A metrological instrument according to claim 26, wherein the processor is operable to correct for the phase shift between the excitation signal and the electrical signal by comparing a first value of the electrical signal, sampled in response to the first phase signal, and a second value of the electrical signal, sampled in response to the second phase signal.

28. A metrological instrument according to claim 27, wherein the first predetermined value of the phase is 45 degrees and the second predetermined value of the phase is 135 degrees.

29. A metrological instrument according to claim 27, wherein the processor is operable to calculate a sum of the square of the first value and the square of the second value, the sum thereby having a value that is independent of the phase shift between the output signal and the electrical signal.

30. A metrological instrument for measuring a characteristic of a surface of a workpiece, the instrument comprising an arm for holding a stylus to be traversed relative to the surface of the workpiece, a transducer for converting a position of the stylus into a corresponding electrical signal, and a control circuit comprising:
   an excitation signal generator for providing to the transducer an excitation signal whose voltage varies in a known manner with time;
   a processor for analysing the electrical signal from the transducer to generate a measurement signal providing a measurement of the position of the stylus;
   wherein the processor is adapted to calculate the phase of the electrical signal by comparing the electrical signal with information about a number of patterns with varying phase properties and identifying the pattern whose phase most closely matches that of the electrical signal, and
   wherein the processor is operable to sample a value of the electrical signal when the phase of the pattern whose phase most closely matches the phase of the electrical signal passes through a predetermined value.

31. A metrological instrument for measuring a characteristic of a surface of a workpiece, the instrument comprising an arm for holding a stylus to be traversed relative to the surface of the workpiece and a transducer circuit for providing a measurement signal indicative of a displacement of the stylus, said transducer circuit comprising:
   a clock for producing a train of clock signals at defined intervals;
   a sub-circuit for providing an analogue signal, the analogue signal having a voltage which varies periodically in accordance with the train of clock signals;
   a transducer operable to vary the analogue signal to generate an electrical signal which is dependent on the position of the stylus;
   an analogue-to-digital converter for converting the electrical signal into a digital signal; and
   a processor for analysing signals received from the sub-circuit and the analogue-to-digital converter to provide a measurement signal providing a measurement of the position of the stylus,
   wherein the processor is adapted to correct for a phase shift between the analogue signal and the electrical signal in accordance with information received from the sub-circuit and the analogue-to-digital converter, and
   wherein the sub-circuit is operable to produce a first phase signal indicating when the analogue signal has a phase corresponding to a first predetermined value.

32. A metrological instrument according to claim 31, wherein the processor is operable to sample the digital signal in response to the first phase signal produced by the sub-circuit.

33. A metrological instrument according to either claim 31 or claim 32, wherein the sub-circuit is operable to produce a second phase signal when the analogue signal has a phase corresponding to a second predetermined value different from the first predetermined value.

34. A metrological instrument according to claim 33, wherein the processor is operable to correct for any phase shift between the analogue signal and the electrical signal by comparing a first value of the digital signal, sampled in response to the first phase signal, and a second value of the digital signal, sampled in response to the second phase signal.

35. A metrological instrument according to claim 34, wherein the first predetermined value of the phase is 45 degrees and the second predetermined value of the phase is 135 degrees.

36. A metrological instrument according to claim 34, wherein the processor is operable to calculate a sum of the first value squared and the second value squared, thereby obtaining a value that is independent of any phase shift between the analogue signal and the digital signal.

37. A metrological instrument for measuring a characteristic of a surface of a workpiece, the instrument comprising an arm for holding a stylus to be traversed relative to the surface of the workpiece and a transducer circuit for providing a measurement signal indicative of a displacement of the stylus, said transducer circuit comprising:
   a clock for producing a train of clock signals at defined intervals;
   a sub-circuit for providing an analogue signal, the analogue signal having a voltage which varies periodically in accordance with the train of clock signals;
   a transducer operable to vary the analogue signal to generate an electrical signal which is dependent on the position of the stylus;
   an analogue-to-digital converter for converting the electrical signal into a digital signal; and
   a processor for analysing signals received from the sub-circuit and the analogue-to-digital converter to provide a measurement signal providing a measurement of the position of the stylus,
   wherein the processor is adapted to correct for a phase shift between the analogue signal and the electrical signal in accordance with information received from the sub-circuit and the analogue-to-digital converter, and
   wherein the processor is operable to compare phase information for the electrical signal with a plurality of reference signals, each reference signal having a corresponding phase, and to thereby identify the reference signal whose phase most closely matches that of the electrical signal.

38. A metrological instrument according to claim 37, wherein the processor is operable to sample a value of the digital signal output from the analogue-to-digital converter when the phase of the reference signal whose phase most closely matches that of the electrical signal passes through a predetermined value.

* * * * *